(12) United States Patent
Ikemoto et al.

(10) Patent No.: US 8,085,316 B2
(45) Date of Patent: Dec. 27, 2011

(54) IMAGE-PROCESSING UNIT, IMAGING APPARATUS, AND COMPUTER PROGRAM PRODUCT

(75) Inventors: Yosuke Ikemoto, Saitama (JP); Hidetoshi Miike, Yamaguchi (JP); Atsushi Osa, Yamaguchi (JP)

(73) Assignees: Hoya Corporation, Tokyo (JP); Yamaguchi University, Yamaguchi (JP)

( * ) Notice: Subject to any disclaimer, the term of this patent is extended or adjusted under 35 U.S.C. 154(b) by 367 days.

(21) Appl. No.: 12/510,521

(22) Filed: Jul. 28, 2009

(65) Prior Publication Data
US 2010/0033597 A1 Feb. 11, 2010

(30) Foreign Application Priority Data
Aug. 7, 2008 (JP) .................................. 2008-203829

(51) Int. Cl.
H04N 5/235 (2006.01)
H04N 5/228 (2006.01)
H04N 5/262 (2006.01)
H04N 5/208 (2006.01)
G06K 9/40 (2006.01)

(52) U.S. Cl. .................... 348/229.1; 348/239; 348/362; 348/252; 348/222.1; 382/266

(58) Field of Classification Search ............... 348/222.1, 348/229.1, 362, 364, 239, 251, 252, 365; 382/162, 167, 266, 274; 358/521, 540
See application file for complete search history.

(56) References Cited

U.S. PATENT DOCUMENTS

| 5,929,908 | A | 7/1999 | Takahashi et al. |
| 6,418,245 | B1 | 7/2002 | Udagawa |
| 6,738,510 | B2 * | 5/2004 | Tsuruoka et al. ............. 382/167 |
| 6,879,731 | B2 | 4/2005 | Kang et al. |
| 7,791,759 | B2 * | 9/2010 | Hoshi .......................... 358/3.01 |
| 2001/0024209 | A1 | 9/2001 | Wakashiro et al. |
| 2002/0008769 | A1 | 1/2002 | Sato |
| 2004/0085458 | A1 * | 5/2004 | Yanof et al. ................. 348/223.1 |
| 2004/0160519 | A1 | 8/2004 | Horita |
| 2004/0218830 | A1 | 11/2004 | Kang et al. |
| 2005/0047676 | A1 | 3/2005 | Kang et al. |
| 2006/0023823 | A1 * | 2/2006 | Sun et al. ...................... 375/362 |

(Continued)

FOREIGN PATENT DOCUMENTS

JP 8-214211 8/1996

(Continued)

OTHER PUBLICATIONS

Search report from European Patent Office (EPO) in EP 09 16 7202, mail date is Feb. 17, 2011.

(Continued)

*Primary Examiner* — Nhan T Tran
(74) *Attorney, Agent, or Firm* — Greenblum & Bernstein, P.L.C.

(57) ABSTRACT

An image-processing unit, comprising an exposure conversion circuit, a standard image-setting circuit, a contour extraction circuit, a contour comparison circuit, a final setting circuit, and an image synthesis circuit, is provided. The exposure conversion circuit generates first and second exposure level image data. The standard image-setting circuit sets standard image data. The contour extraction circuit extracts standard and first comparison contours on the basis of the standard image data. The contour comparison circuit detects a first accordance indicator on the basis of the contours. The final setting circuit sets the first conclusive threshold on the basis of the first accordance indicator. The image synthesis circuit generates the rendered image data based on the first conclusive threshold.

18 Claims, 30 Drawing Sheets

U.S. PATENT DOCUMENTS

| | | |
|---|---|---|
| 2006/0044431 A1 | 3/2006 | Ovsiannikov |
| 2006/0170942 A1 | 8/2006 | Chiba |
| 2007/0216958 A1 | 9/2007 | Narukawa et al. |
| 2008/0043120 A1* | 2/2008 | Mitsunaga .................... 348/238 |
| 2008/0050031 A1* | 2/2008 | Itoh et al. ..................... 382/260 |
| 2008/0123952 A1 | 5/2008 | Parkkinen et al. |
| 2008/0231730 A1* | 9/2008 | Tsuruoka .................. 348/229.1 |

FOREIGN PATENT DOCUMENTS

| | | |
|---|---|---|
| JP | 10-42182 | 2/1998 |
| JP | 2006-525747 | 11/2006 |
| JP | 2007-180811 | 7/2007 |
| JP | 2007-235786 | 9/2007 |
| JP | 2008-104009 | 5/2008 |
| WO | 2008/065501 | 6/2008 |

OTHER PUBLICATIONS

English language Abstract of JP 8-214211, Aug. 20, 1996.
English language Abstract of JP 10-42182, Feb. 13, 1998.
English language Abstract of JP 2006-525747, Nov. 9, 2006.
English language Abstract of JP 2007-180811, Jul. 12, 2007.
English language Abstract of JP 2007-235786, Sep. 13, 2007.
English language Abstract of JP 2008-104009, May 1, 2008.

* cited by examiner

| Ev(x−2, y−2, 1) | Ev(x−1, y−2, 1) | Ev(x, y−2, 1) | Ev(x+1, y−2, 1) | Ev(x+2, y−2, 1) |
|---|---|---|---|---|
| Ev(x−2, y−1, 1) | Ev(x−1, y−1, 1) | Ev(x, y−1, 1) | Ev(x+1, y−1, 1) | Ev(x+2, y−1, 1) |
| Ev(x−2, y, 1) | Ev(x−1, y, 1) | Ev(x, y, 1) | Ev(x+1, y, 1) | Ev(x+2, y, 1) |
| Ev(x−2, y+1, 1) | Ev(x−1, y+1, 1) | Ev(x, y+1, 1) | Ev(x+1, y+1, 1) | Ev(x+2, y+1, 1) |
| Ev(x−2, y+2, 1) | Ev(x−1, y+2, 1) | Ev(x, y+2, 1) | Ev(x+1, y+2, 1) | Ev(x+2, y+2, 1) |

SMOOTHING

Ev1(x, y, 1)

IMAGE-PROCESSING UNIT, IMAGING APPARATUS, AND COMPUTER PROGRAM PRODUCT

BACKGROUND OF THE INVENTION

1. Field of the Invention

The present invention relates to an image-processing unit that generates a high dynamic range image using a single set of image data.

2. Description of the Related Art

Various imaging apparatuses, such as digital still cameras, video cameras, electronic endoscopes, etc., which capture scenes or subjects are commonly known. Imaging apparatuses generate an image signal corresponding to a captured scene or subject. The generated image signal is digitized into image data. The image data undergoes predetermined data processing, and then is transmitted to a monitor to be displayed as an image, or transferred to a memory for storage.

Image data to be transmitted to an all-purpose monitor is generally standardized to 8-bit digital data. Accordingly, an image corresponding to the standardized image data comprises a plurality of pixels whose luminance value varies from 0 to 255.

The larger the luminance difference between neighboring pixels, the clearer the shade and contour of a subject will be in a displayed image. Accordingly, if the difference between minimum and maximum luminance in a subject or a scene to be captured is small, a clear image with fewer overexposed or underexposed sub-images can be displayed by capturing the subject or the scene by adjusting the exposure such that the minimum and maximum luminance are 0 and 255, respectively. However, if the difference between minimum and maximum luminances is large, it is difficult to simultaneously display low and high luminance sub-images clearly.

To solve this difficulty, a high dynamic range image, hereinafter referred to as an HDR image, is known. Japanese Unexamined Patent Publication No. 2008-104009 discloses that the an HDR image may be rendered using image data generated based on a plurality of images of the same subject captured at diverse exposures.

However, in the HDR rendering disclosed by the patent Publication, since there are time lags while the subject is captured several times, the location of a moving subject shifts between successively captured images. As a result, an HDR image will be blurred.

In addition, in prior art HDR rendering, adequate sub-images are selected for every partial area of an entire image to be rendered among sub-images for the same partial area in images captured with varying an exposure. The adequate sub-image is selected by comparing the luminance of sub-images for a given partial area with a fixed threshold. However, the problem arises that a border, between sub-images neighboring each other selected from different captured images on the basis of comparison of luminance with the fixed threshold might, be displayed distinguishably.

SUMMARY OF THE INVENTION

Therefore, an object of the present invention is to provide an image-processing unit that generates HDR images using only a single set of image data.

According to the present invention, an image-processing unit, comprising a gradation extension circuit, an original image setting circuit, an exposure conversion circuit, a standard image-setting circuit, a tentative setting circuit, a classification circuit, a contour extraction circuit, a contour comparison circuit, a final setting circuit, and an image synthesis circuit, is provided. The image-processing unit generates rendered image data on the basis of first image data. The rendered image data comprises pixel data whose value may range to $m2$. $m2$ is a positive integer. The first image data comprises pixel data whose value may range to $m1$. $m1$ is a positive integer. The gradation extension circuit converts the first image data into third image data if $m1$ is less than $m2$. The third image data comprises pixel data whose value may range to $m3$. $m3$ is greater than $m1$. The original image setting circuit sets original image data to the third image data if $m1$ is less than $m2$. The exposure conversion circuit generates first and second exposure level image data on the basis of the original image data. The first exposure level image data is generated by converting the values of the pixel data in the original image data, less than $s1$, between $s1$ and $t1$, and greater than $t1$ into $u1$, the values which approach $v1$ from $u1$ in proportion to the value in the original image data in the range between the $s1$ and the $t1$, and $v1$, respectively. $s1$ is an integer greater than or equal to 1 and less than $m2$. $u1$ is an integer greater than or equal to 1. $t1$ is an integer greater than $s1$ and less than or equal to $m2$. $v1$ is an integer greater than $u1$ and less than or equal to $m2$. The second exposure level image data is generated by converting the values of the pixel data in the original image data, less than $s2$, between $s2$ and $t2$, and greater than $t2$ into $u2$, the values which approach $v2$ from $u2$ in proportion to the value in the original image data in the range between $s2$ and $t2$, and $v2$, respectively. $s2$ is an integer greater than $s1$ and less than $m2$. $u2$ is an integer greater than or equal to 1. $t2$ is an integer greater than $s2$ and $t1$ and less than or equal to $m2$. $v2$ is an integer greater than $u2$ and less than or equal to $m2$. The standard image-setting circuit sets standard image data to image data comprising pixel data whose value may range to $m4$ on the basis of the first image data. $m4$ is a positive integer. The tentative setting circuit sets a first tentative threshold within the range between the lowest value and $m4$. The classification circuit classifies pixels corresponding to the pixel data which the standard image data comprises to either first or second classified pixel. The pixel corresponding to the pixel data whose value is less than or greater than the first tentative threshold is classified to the first and second classified pixel, respectively. The contour extraction circuit extracts standard and first comparison contours and detects locations of the standard and first comparison contours. The standard contour is a contour of subject in an image corresponding to the standard image data. The first comparison contour is a dividing line between the first and second classified neighboring pixels. The contour comparison circuit detects a first accordance indicator to indicate how much the locations of the standard and first comparison contours accord to each other. The final setting circuit orders the tentative setting circuit, the classification circuit, the contour extraction circuit, and the contour comparison circuit to repeatedly carry out the change of the first tentative threshold, the classification to the first and second classified pixels, the detection of the locations of the standard and first comparison contours, and the detection of the first accordance indicator, respectively, at least until maximum of the first accordance indicator is detected. The final setting circuit sets a first conclusive threshold to the first tentative threshold whose the first accordance indicator is the highest among detected ones. The image synthesis circuit generates the rendered image data by replacing the pixel data in the standard image data whose value is less than the first conclusive threshold with the pixel data in the first exposure level image data and replacing the pixel data in the standard image data whose value is less than the first conclusive threshold with the pixel data in the second exposure level image data.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
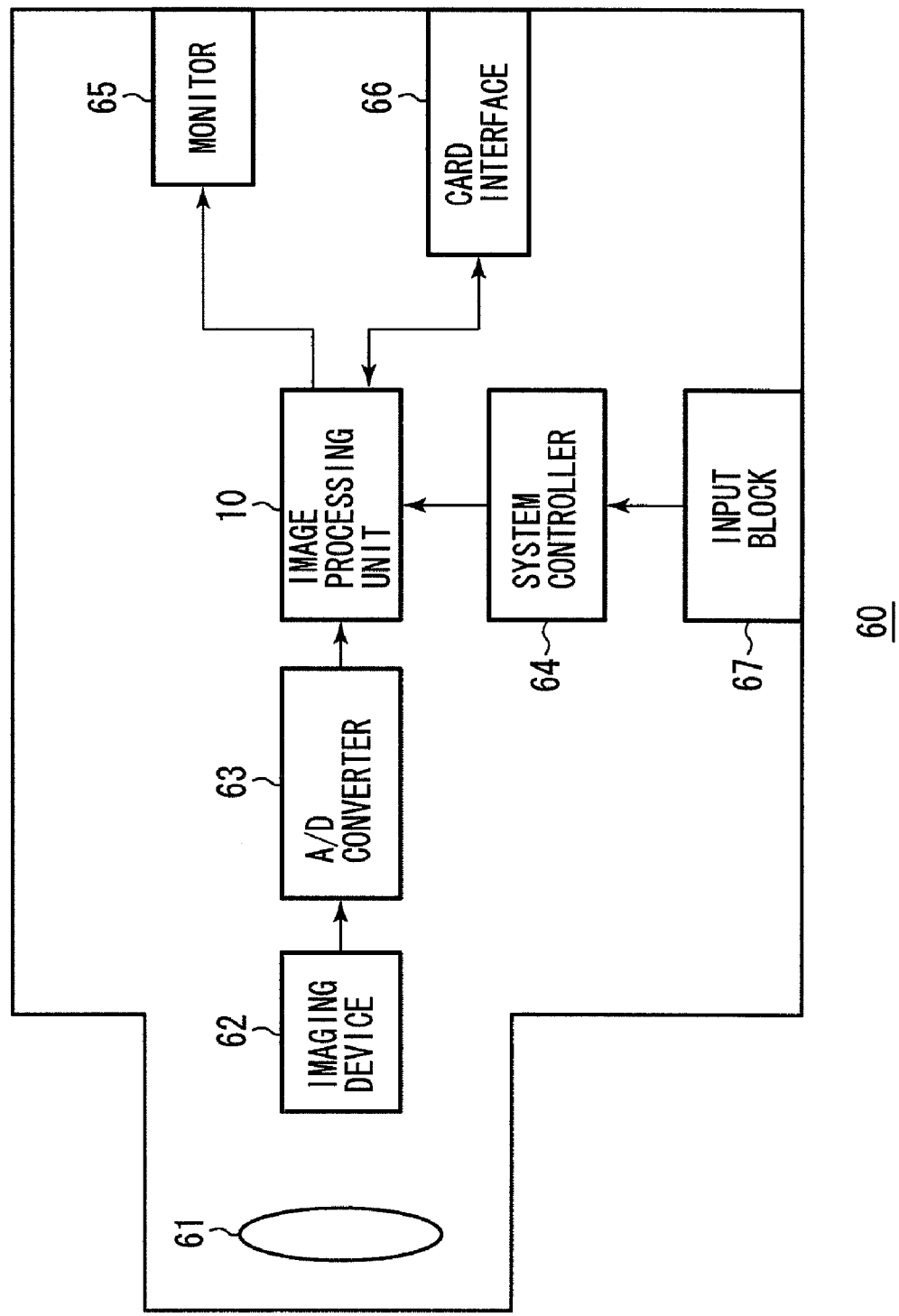
FIG. 1 is a block diagram showing the internal structure of a digital camera having an image-processing unit of a first embodiment of the present invention.

The present invention is described below with reference to the embodiment shown in the drawings.

In FIG. 1, a digital camera 60 of the first embodiment comprises a photographic optical system 61, an imaging device 62, an A/D converter 63, an image-processing unit 10, a system controller 64, a monitor 65, a card interface 66, an input block 67, and other components.

The photographic optical system 61 is optically connected to the imaging device 62. An optical image of a subject through the photographic optical system 61 is incident on the light-receiving surface of the imaging device 62. The imaging device 62 is, for example, a CCD area sensor. When the imaging device 62 captures the optical image of the subject upon its light-receiving surface, the imaging device 62 generates an image signal corresponding to the captured optical image.

A plurality of pixels are arranged as a matrix on the light-receiving surface. Each pixel comprises a photodiode (not depicted), which generates a pixel signal corresponding to the amount of received light. A frame of an image signal comprises a plurality of pixel signals corresponding to the pixels arranged on the light-receiving surface.

The imaging device 62 is connected to the A/D converter 63. The image signal generated by the imaging device 62 is transmitted to the A/D converter 63. The A/D converter 63 digitizes the received image signal into image 8-bit data. In the digitization of the image signal, pixel signals which a frame of image signal comprises are digitized into pixel data.

The A/D converter 63 is connected to the image-processing unit 10. The digitized image data is transmitted to the image-processing unit 10. The image-processing unit 10 can carry out data processing for digital 16-bit data. The image-processing unit 10 carries out predetermined image processing on the received image data.

The image-processing unit 10 is connected to the monitor 65 and the card interface 66. The image data, which has undergone predetermined image processing, is transmitted to the monitor 65, where an image corresponding to the received image is displayed. In addition, the image data can be transmitted to a memory card (not depicted), which can be connected to, and disconnected from the card interface 66, via the card interface 66, in which image data is stored.

The image-processing unit 10 is connected to the system controller 64. The system controller 64 controls image processing of the image-processing unit 10. The system controller 64 is connected to other components of the digital camera 60, and controls the operations of the components. The system controller 64 is connected to the input block 67. The system controller 64 controls each component on the basis of an operational command input by a user to the input block 67.

For example, when a user inputs an operational command for displaying an image to the input block 67, an image corresponding to the image data stored in the memory card is displayed by ordering the image-processing unit 10 to read image data from the memory card and to output it to the monitor 65.

The digital camera 60 is able to render at high dynamic range, hereinafter, referred to as HDR rendering.

The image-processing unit 10 carries out HDR rendering on the image data transmitted from the A/D converter 63 or read from the memory card. Image data generated according to HDR rendering, hereinafter referred to as rendered image data, is transmitted to the monitor 65 and the memory card. An HDR image corresponding to the received rendered image data is displayed on the display 65. In addition, the rendered image data is stored in the memory card.

Figure 2:
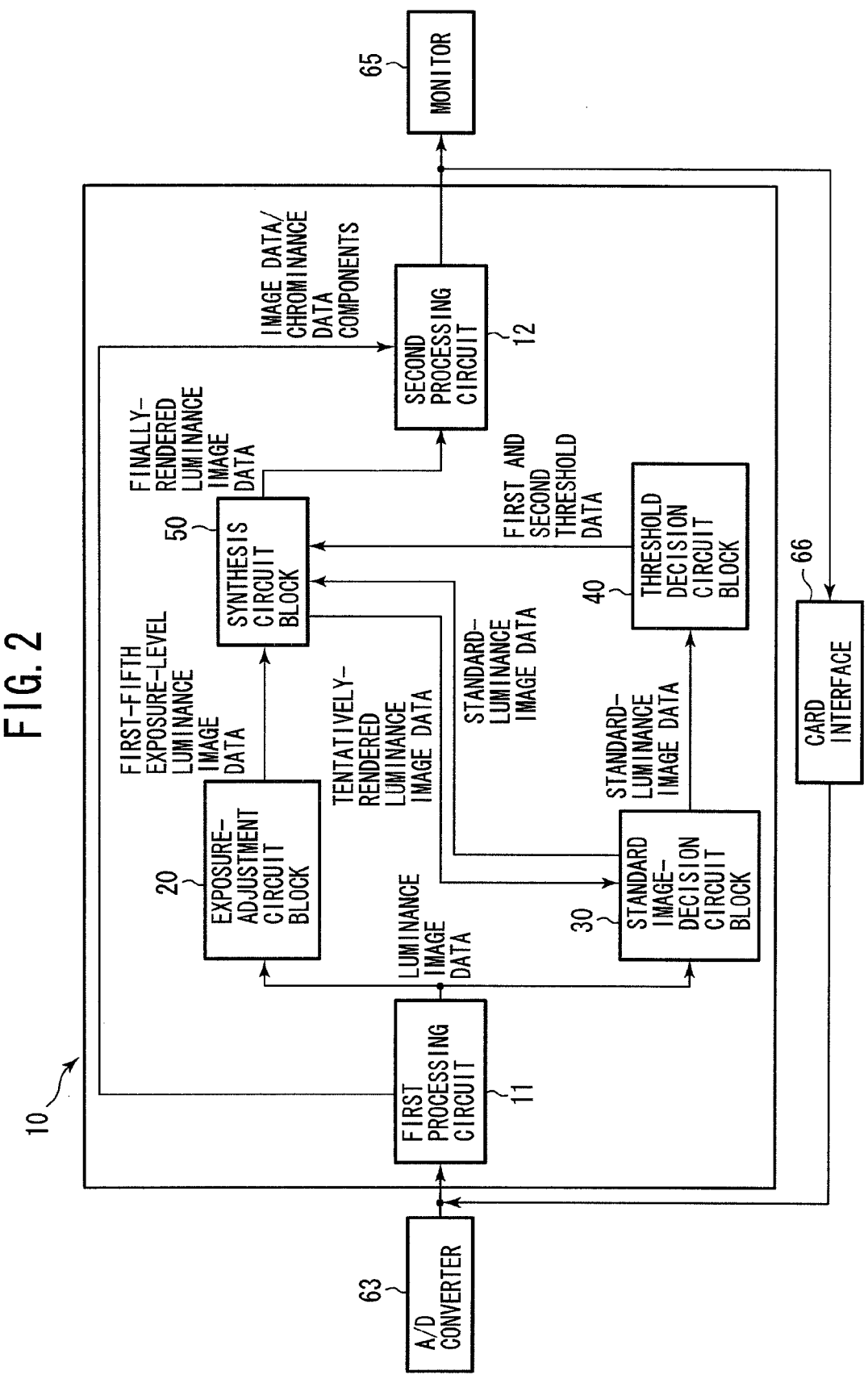
FIG. 2 is a block diagram showing the internal structure of the image-processing unit of the first embodiment.

Next, the structure of the image-processing unit 10 is explained using FIG. 2. The image-processing unit 10 comprises a first processing circuit 11, an exposure-adjustment circuit block 20, a standard image-decision circuit block 30, a threshold decision circuit block 40, a synthesis circuit block 50, a second processing circuit 12, and other circuit blocks.

Image data transmitted from the A/D converter 63 or from the card interface 66 is received by the first processing circuit 11. The first processing circuit 11 carries out predetermined data processing, such as white-balance processing, color-interpolation processing, and luminance/chrominance conversion processing.

The first processing circuit 11 is connected to the second processing circuit 12. If HDR rendering is not carried out, the image data is transmitted from the first processing circuit 11 to the second processing circuit 12. The second processing circuit 12 carries out predetermined data processing, such as clamp processing and gamma-correction processing. The image data, which has undergone predetermined data processing, is transmitted from the second processing circuit 12 to the monitor 65 or the card interface 66.

The first processing circuit 11 is also connected to the exposure-adjustment circuit block 20 and the standard image-decision circuit block 30. If HDR rendering is carried out, chrominance data components of the image data are transmitted to the second processing circuit 12, and the luminance data component of the image data, hereinafter luminance image data, is transmitted to the exposure-adjustment circuit block 20 and the standard image-decision circuit block 30.

In HDR rendering, only the luminance image data will undergo data processing at the exposure-adjustment circuit block 20, the standard image-decision circuit block 30, the threshold decision circuit block 40, and the synthesis circuit block 50. The original chrominance data component of the image data is used as one for the rendered image data without data processing.

The exposure-adjustment circuit block 20 generates first-fifth exposure-level luminance image data corresponding to monochrome images whose exposure level is changed among five levels on the basis of the luminance image data. The exposure-adjustment circuit block 20 is connected to the synthesis circuit block 50. The first-fifth exposure-level luminance image data is transmitted to the synthesis circuit block 50.

As described later, the standard image-decision circuit block 30 decides standard-luminance image data used for generation of a finally-rendered luminance image data which is the luminance data component of the rendered image data. The standard image-decision circuit block 30 is connected to the threshold decision circuit block 40 and the synthesis circuit block 50. The decided standard-luminance image data is transmitted to the threshold decision circuit block 40 and the synthesis circuit block 50.

The threshold decision circuit block 40 decides first and second conclusive thresholds on the basis of the standard-luminance image data. As described later, the first and second conclusive thresholds are used for determining which luminance image data among the first-fifth exposure-level luminance image data is used for parts of an HDR image. The threshold decision circuit block 40 is connected to the synthesis circuit block 50. The first and second threshold data corresponding to the first and second conclusive thresholds, respectively, are transmitted to the synthesis circuit block 50.

The synthesis circuit block 50 generates the finally-rendered luminance image data on the basis of the received first-fifth exposure-level luminance image data, the received standard-luminance image data, and the first and second threshold data. The synthesis circuit block 50 is connected to the second processing circuit 12. The finally-rendered luminance image data is transmitted from the synthesis circuit block 50 to the second processing circuit 12.

As described above, the finally-rendered luminance image data generated by the synthesis circuit block 50 is a luminance data component corresponding to the HDR image, and the chrominance data components corresponding to the HDR image are transmitted from the first processing circuit 11 to the second processing circuit 12. The second processing circuit 12 carries out predetermined data processing on the rendered image data on the basis of the finally-rendered luminance image data and chrominance data component which are transmitted from the synthesis circuit block 50 and the first processing circuit 11, respectively. The rendered image data is transmitted to the monitor 65 or the card interface 66, as in the case of non-HDR-rendered image data.

Next, structures and functions of the exposure-adjustment circuit block 20, the standard image-decision circuit block 30, the threshold decision circuit block 40, and the synthesis circuit block 50 are explained in detail below.

Figure 3:
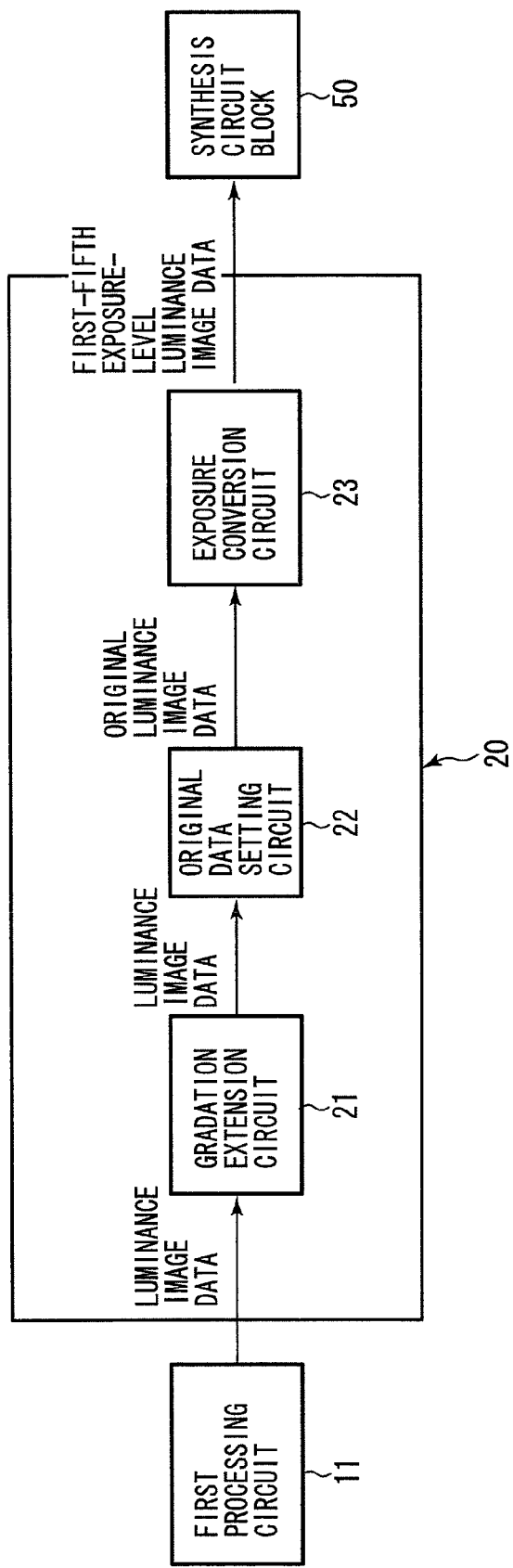
FIG. 3 is a block diagram showing the internal structure of the exposure-adjustment circuit block of the first and second embodiments.

As shown in FIG. 3, the exposure-adjustment circuit block 20 comprises a gradation extension circuit 21, an original image setting circuit 22, and an exposure conversion circuit 23. The gradation extension circuit 21, the original image setting circuit 22, and an exposure conversion circuit 23 are connected in series.

The luminance image data transmitted from the first processing circuit 11 is received by the gradation extension circuit 21. The gradation expansion circuit 21 detects the word length, in bits, of the received luminance image data. The word length of the luminance image data transmitted from the A/D converter is 8 bits. However, the word length of the luminance image data transmitted from the memory card is not constant. Therefore, the inconstant word length of the luminance image data is detected.

If the word length of the received luminance image data is greater than 8, the luminance image data is transmitted to the original image setting circuit 22 without carrying out any other data processing. If the word length of the received luminance image data is less than 8, the gradation expansion circuit 21 carries out gradation extension processing, as explained below, on the luminance image data.

In gradation extension processing, one pixel is selected to be the focused pixel. At the same time, 25 pixels arranged in five columns and five rows around the selected focused pixel are selected to be surrounding pixels. The average of values of the luminance data component of the pixel data corresponding to the selected focused and surrounding pixels, (hereinafter referred to as local average value), is calculated. The difference between the local average value and the value for the focused pixel is multiplied by a predetermined amplification coefficient, and then an extension value is calculated. The local average value and the extension value are summed, and the summed value is substituted for the value of the luminance data component corresponding to the selected focused pixel. The word length of the luminance data component is increased because the significant digits for the value increase on calculating the local average value.

All the pixels corresponding to all pixel data which is derived from the luminance image data, are selected in order to be the focused pixel. Extension of the word length of the luminance image data is completed by calculating and replacing the summed values for all pixels. The luminance image data which has undergone gradation extension processing (third image data) is transmitted to the original image setting circuit 22.

The original image setting circuit 22 sets the original luminance image data to the received luminance image data. The original luminance image data is transmitted to the exposure conversion circuit 23.

The exposure conversion circuit 23 generates the first-fifth exposure-level luminance image data on the basis of the received original luminance image data. The method for generating the first-fifth exposure-level luminance image data is explained below.

Figure 4:
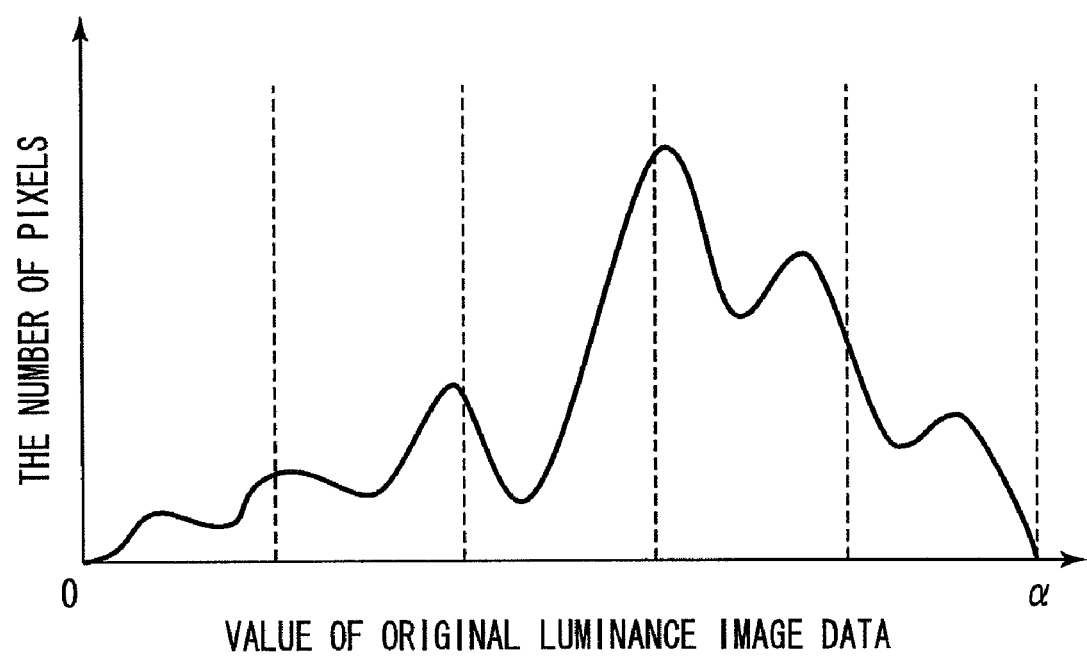
FIG. 4 is a pixel data histogram from the original luminance image data.

The word length of the original luminance image data is not constant. As shown in the histogram of FIG. 4, values of pixel data which the original luminance image data comprises ranges from zero to a maximum, (hereinafter referred to as a), which is calculated by the formula $\alpha = 2^{\wedge}$(the word length of the original luminance image data)$-1$.

Figure 5:
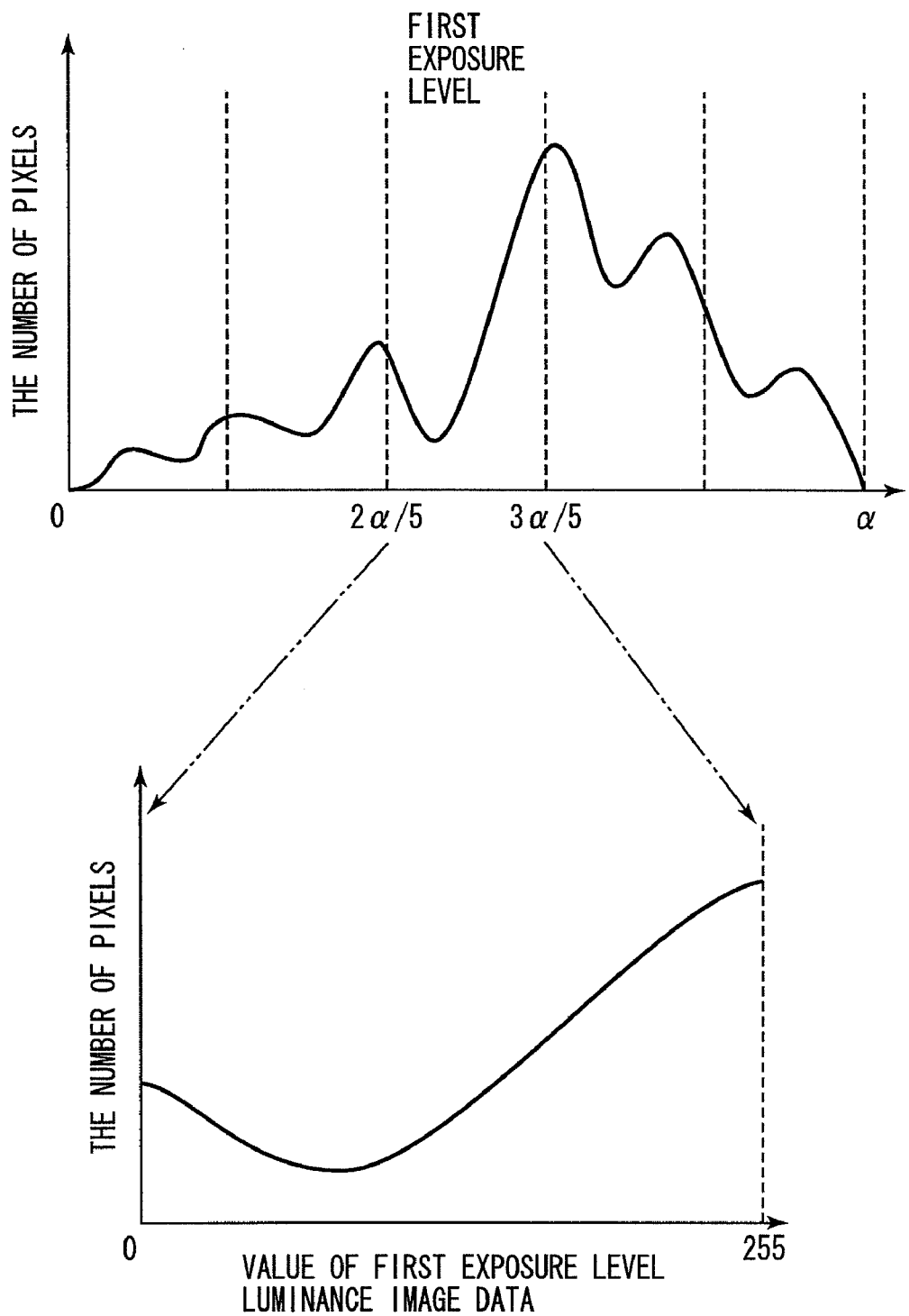
FIG. 5 shows pixel data histograms from both the original luminance image data and the first exposure-level luminance image data, and the relationship between the values the original luminance image data and the first exposure-level luminance image data.

The values of the pixel data in the original luminance image data between $\alpha \times 2/5$ (s1) and $\alpha \times 3/5$ (t1) are converted such that the converted value ranges between zero (u1) and 225 (v1), (i.e., 8 bits), in linear proportion to the original value (see FIG. 5). In addition, all the values of the pixel data in the original luminance image data between zero and $\alpha \times 2/5$ are converted to zero. In addition, all the values of pixel data in the original luminance image data between $\alpha \times 3/5$ and $\alpha$ are converted to 255. The first exposure-level luminance image data is generated by converting the values of all pixel data in the original luminance image data.

Figure 6:
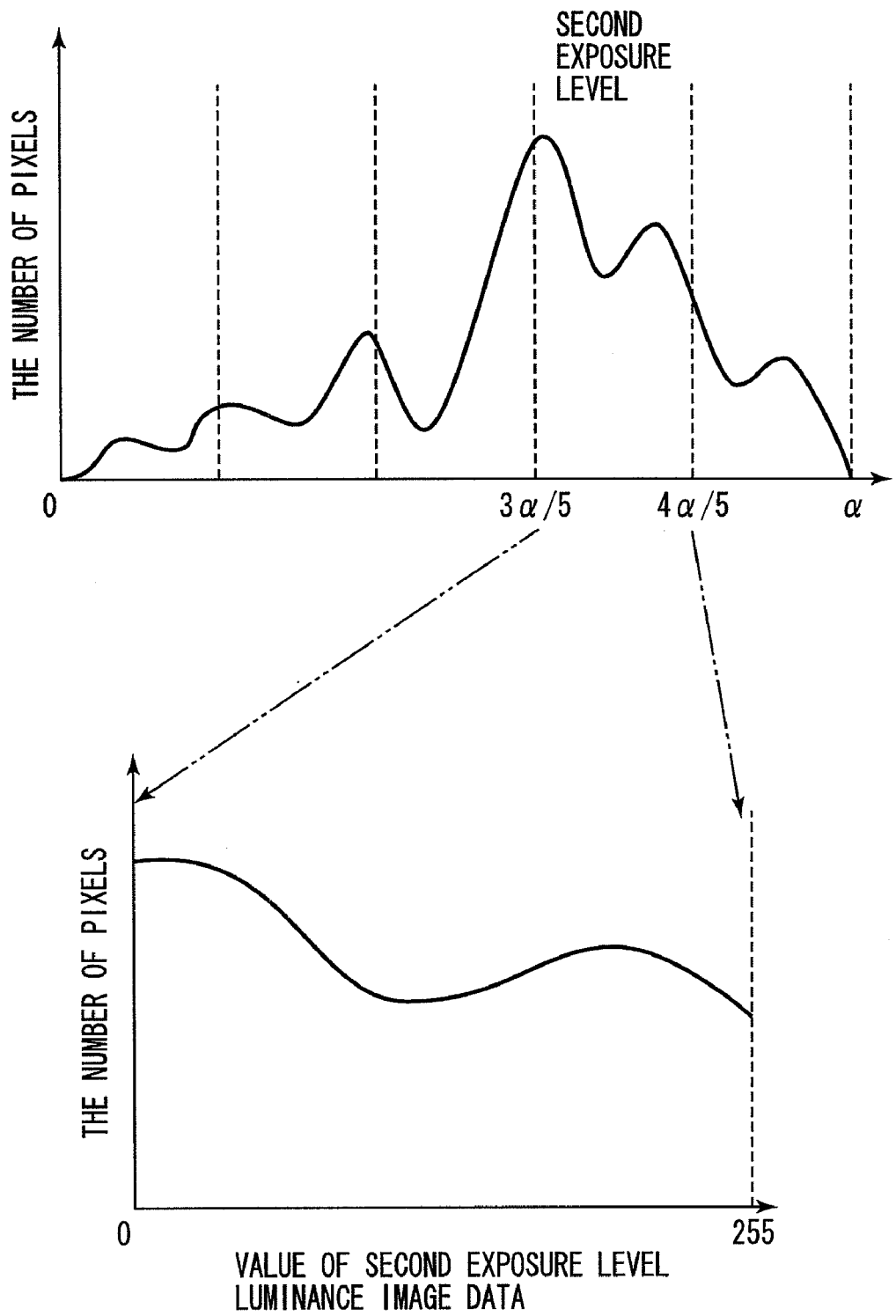
FIG. 6 shows pixel data histograms from both the original luminance image data and the second exposure-level luminance image data, and the relationship between the values the original luminance image data and the second exposure-level luminance image data.

The values of the pixel data in the original luminance image data between $\alpha \times 3/5$ (s2) and $\alpha \times 4/5$ (t2) are converted such that the converted value ranges between zero (u2) and 225 (v2) in linear proportion to the original value (see FIG. 6). In addition, all the values of pixel data in the original luminance image data between zero and $\alpha \times 3/5$ are converted to zero. In addition, all the values of the pixel data in the original luminance image data between $\alpha \times 4/5$ and $\alpha$ are converted to the 255. The second exposure-level luminance image data is generated by converting the values of all pixel data in the original luminance image data.

Figure 7:
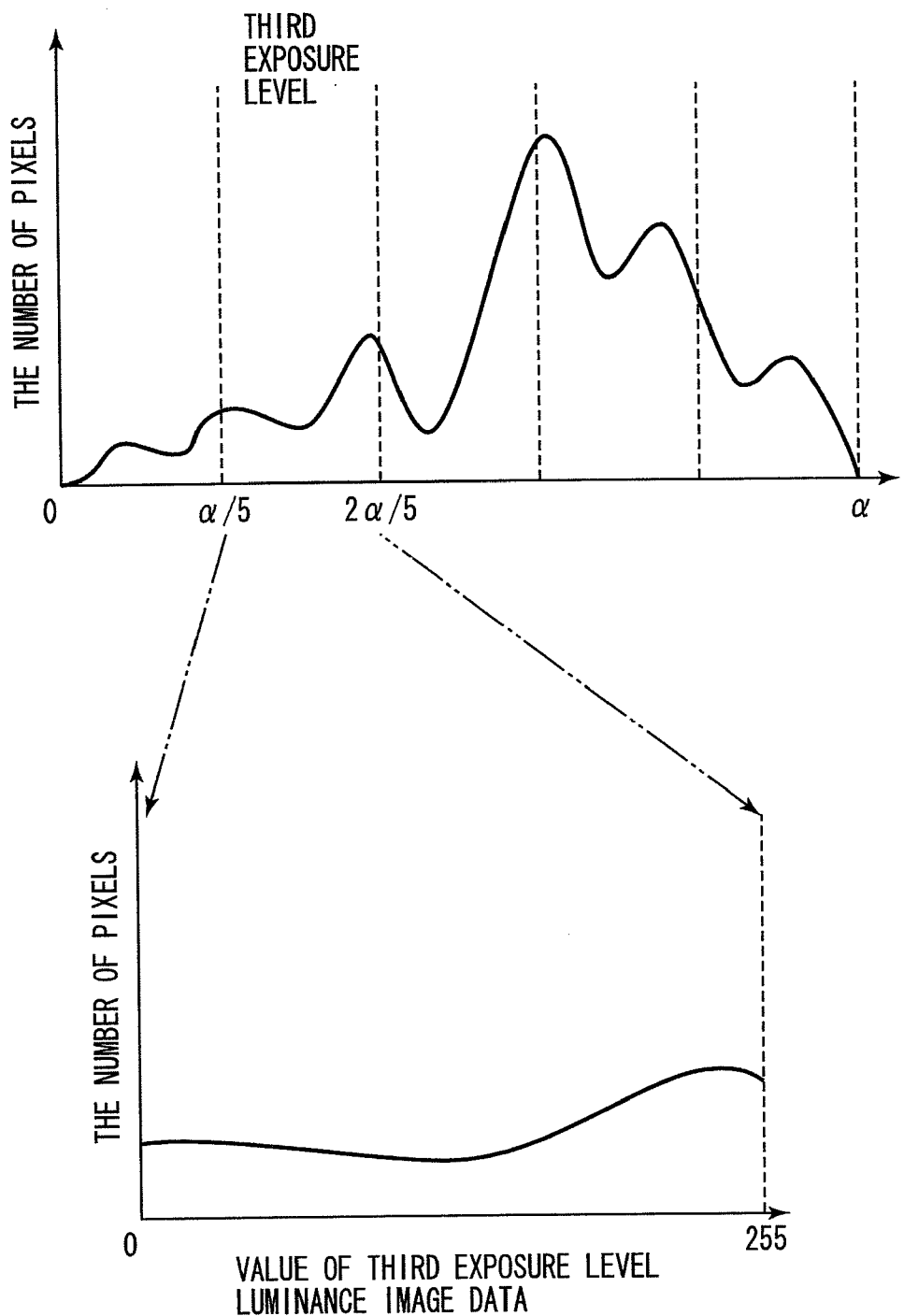
FIG. 7 shows pixel data histograms from both the original luminance image data and the third exposure-level luminance image data, and the relationship between the values the original luminance image data and the third exposure-level luminance image data.

The values of the pixel data in the original luminance image data between $\alpha \times 1/5$ (s3) and $\alpha \times 2/5$ (t3) are converted such that the converted value ranges between zero (u3) and 225 (v3) in linear proportion to the original value (see FIG. 7). In addition, all the values of the pixel data in the original luminance image data between zero and $\alpha \times 1/5$ are converted to zero. In addition, all the values of pixel data in the original luminance image data between $\alpha \times 2/5$ and a are converted to 255th level. The third exposure-level luminance image data is generated by converting the values of all pixel data in the original luminance image data.

Figure 8:
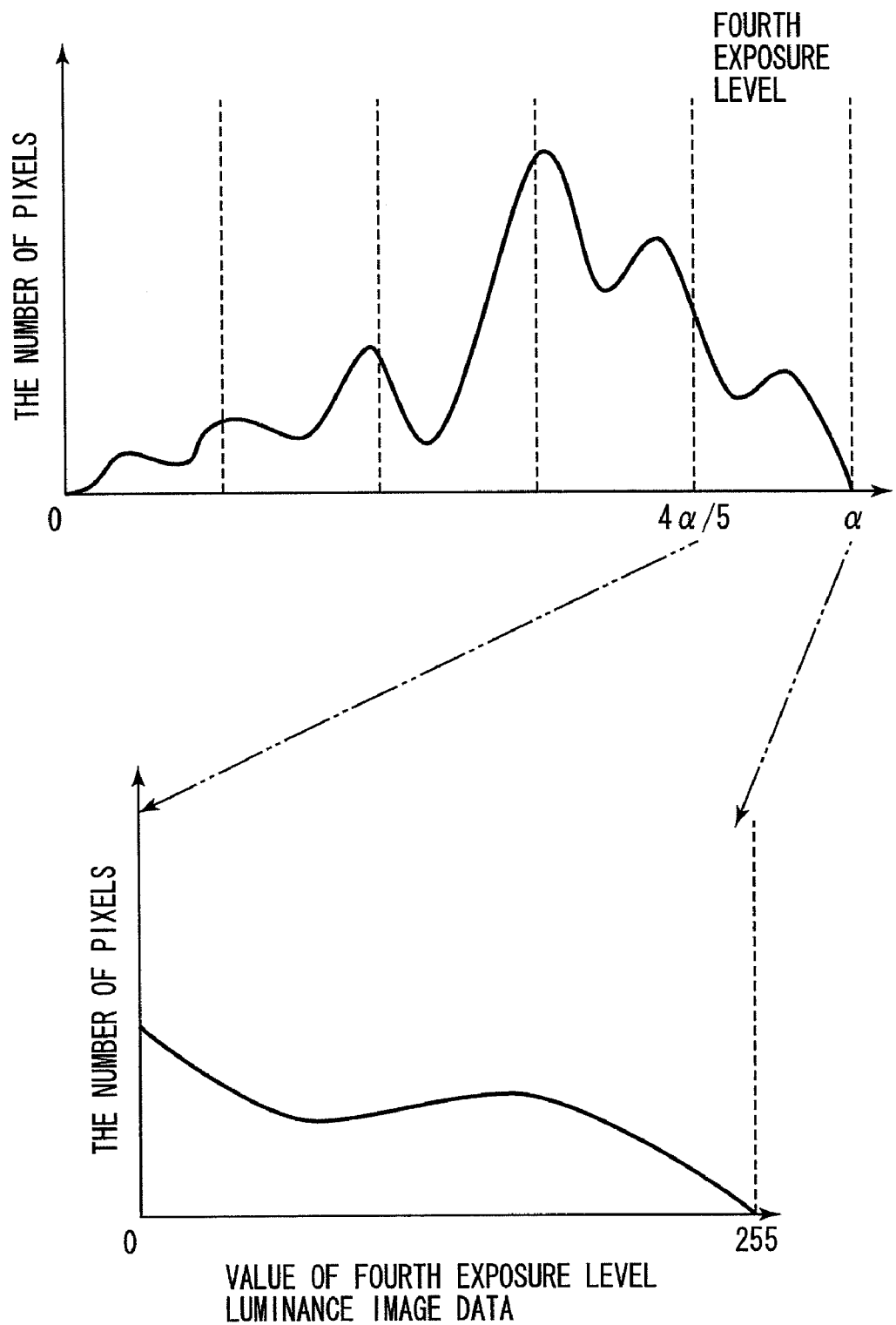
FIG. 8 shows pixel data histograms from both the original luminance image data and the fourth exposure-level luminance image data, and the relationship between the values the original luminance image data and the fourth exposure-level luminance image data.

The values of pixel data in the original luminance image data between levels $\alpha \times 4/5$ (s4) and a (t4) are converted such that the converted value ranges between zero (u4) and 225 (v4) in linear proportion to the original value (see FIG. 8). In addition, all the values of the pixel data in the original luminance image data between zero and $\alpha \times 4/5$ are converted to zero. The fourth exposure-level luminance image data is generated by converting the values of all pixel data in the original luminance image data.

Figure 9:
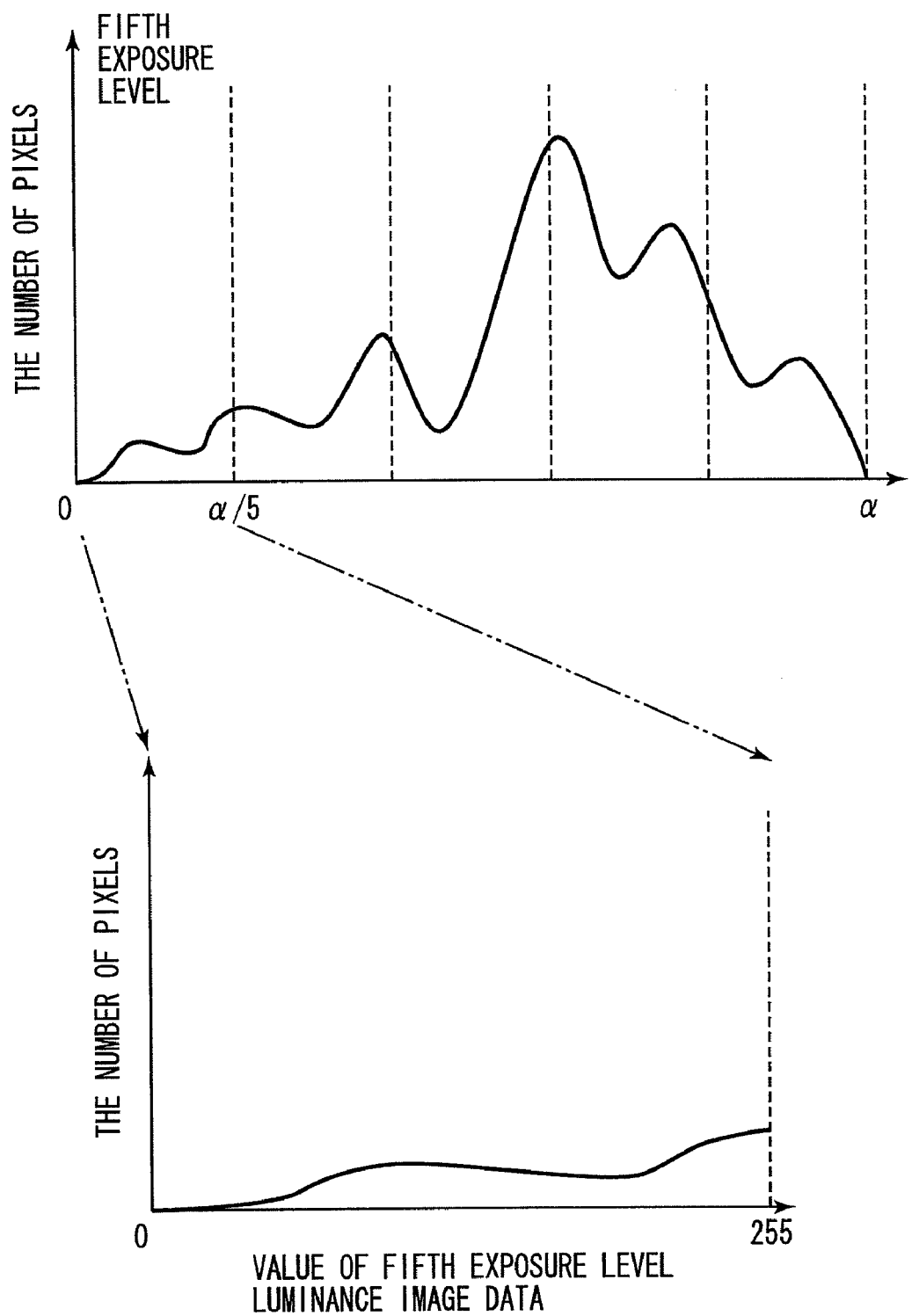
FIG. 9 shows pixel data histograms from both the original luminance image data and the fifth exposure-level luminance image data, and the relationship between the values the original luminance image data and the fifth exposure-level luminance image data.

The values of pixel data in the original luminance image data between levels zero and $\alpha \times 1/5$ are converted such that the converted value ranges between zero and 225 in linear proportion to the original value (see FIG. 9). In addition, all the values of pixel data in the original luminance image data between $\alpha \times 1/5$ and $\alpha$ are converted to 255. The fifth exposure-level luminance image data is generated by converting the values of all pixel data in the original luminance image data.

As described above, the generated first-fifth exposure-level luminance image data are transmitted to the synthesis circuit block 50.

Figure 10:
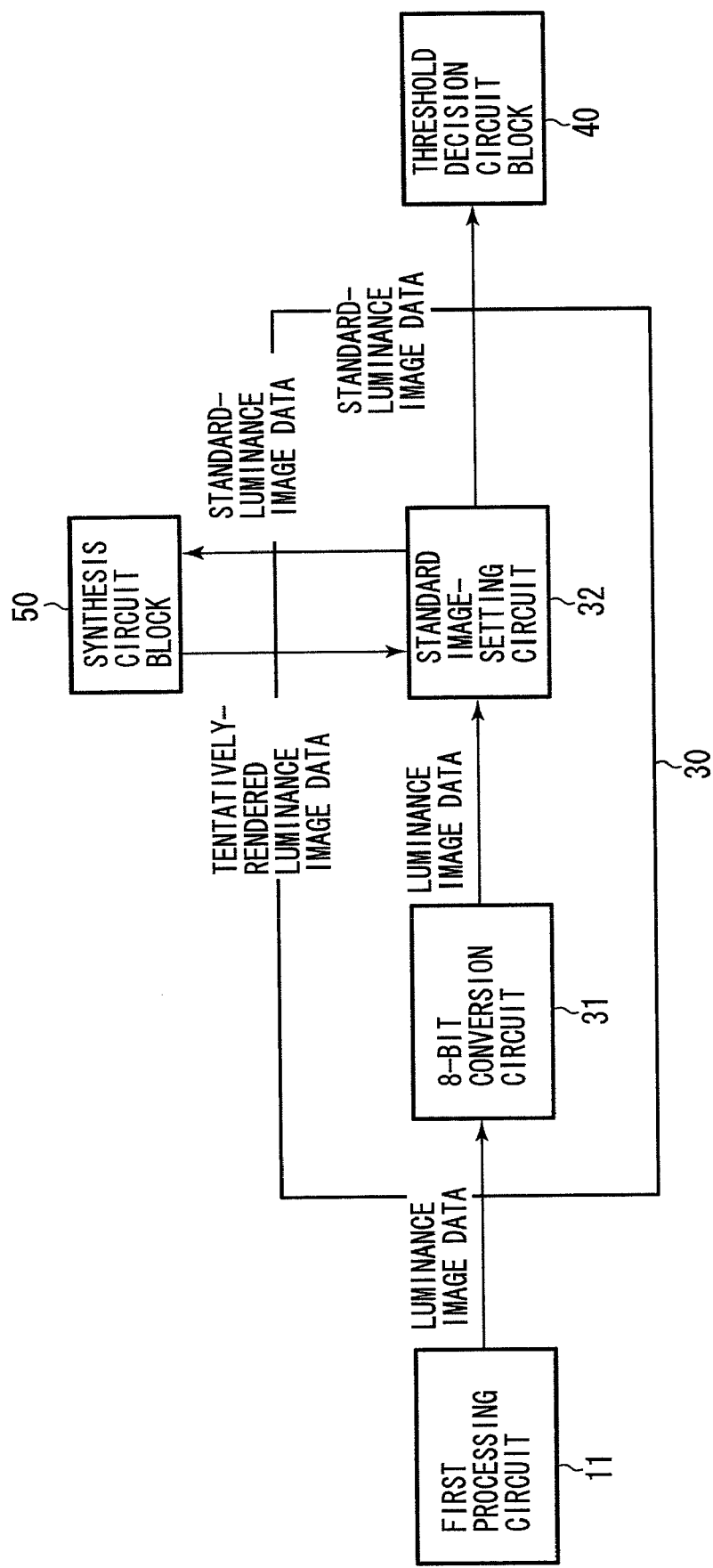
FIG. 10 is a block diagram showing the internal structure of the standard image-decision circuit block of the first and second embodiments.

Next, the structure of the standard image-decision circuit block 30 is explained below using FIG. 10. The standard image-decision circuit block 30 comprises an 8-bit conversion circuit 31 and a standard image-setting circuit 32. The 8-bit conversion circuit 31 and the standard image-setting circuit 32 are connected in series.

The luminance image data transmitted from the first processing circuit 11 is received by the 8-bit conversion circuit 31. The 8-bit conversion circuit 31 converts the received luminance image data into 8 bits of luminance image data by multiplying all pixel data which the received luminance image data comprises by a coefficient (equal to $256/2^{\wedge}$(the word length of the received luminance image data). The converted luminance image data is transmitted to the standard image-setting circuit 32. In addition, the luminance image data whose word length is originally 8 is transmitted to the standard image-setting circuit 32 without above word length conversion.

The standard image-setting circuit 32 sets the standard-luminance image data to the received luminance image 8-bit data. The standard-luminance image data is used in the threshold decision circuit block 40 and the synthesis circuit block 50. In addition, the standard image-setting circuit 32 is connected to the synthesis circuit block 50, and as described later, the tentatively-rendered luminance image data may be transmitted from the synthesis circuit block 50 to the standard image-setting circuit 32. When the standard image-setting circuit 32 receives the tentatively-rendered luminance image data, the standard-luminance image data is set to the tentatively-rendered luminance image data instead of the luminance image data transmitted from the 8-bit conversion circuit 31. The set standard-luminance image data is transmitted to the threshold decision circuit block 40 and the synthesis circuit block 50.

Figure 11:
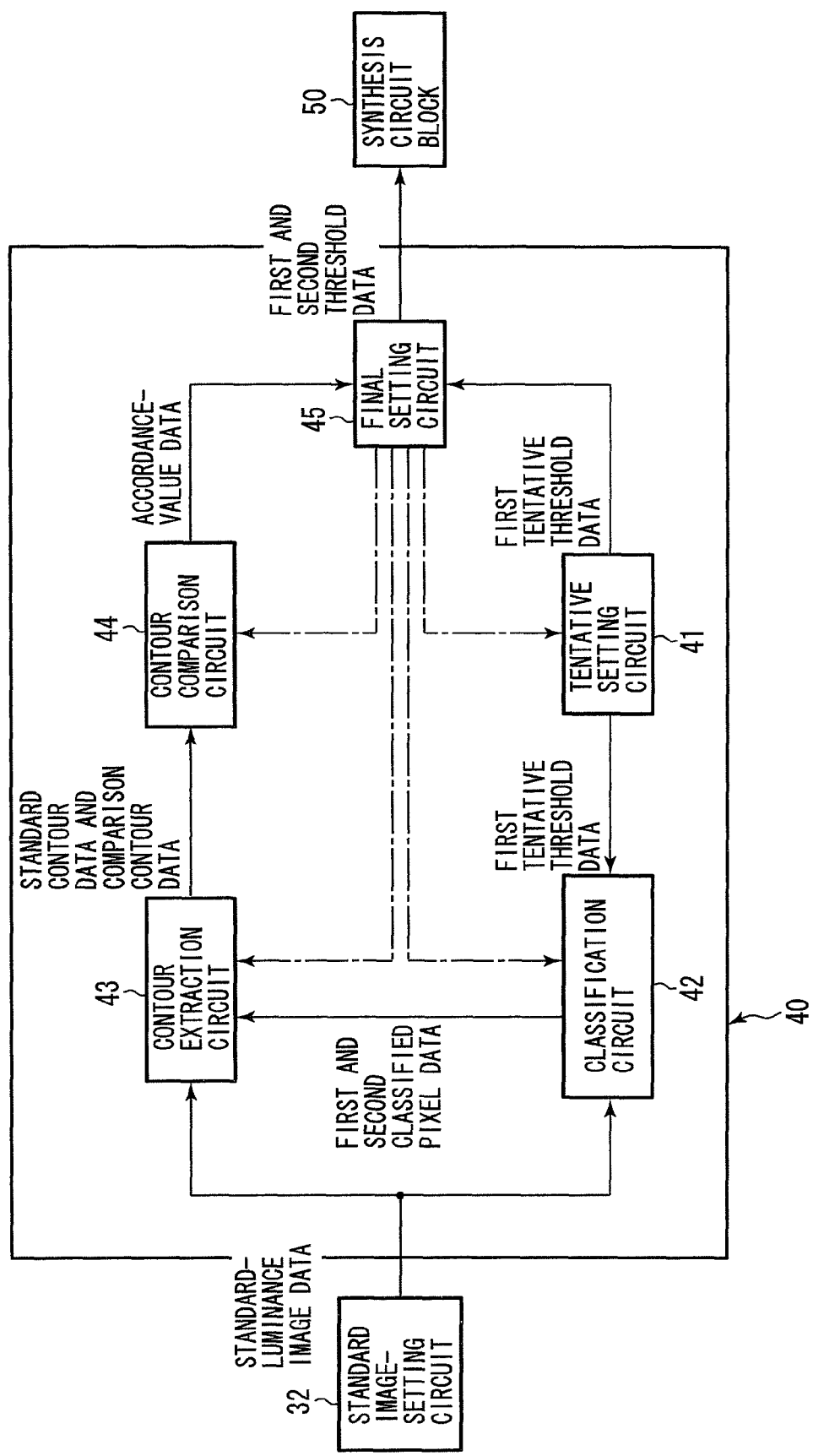
FIG. 11 is a block diagram showing the internal structure of the threshold decision circuit block of the first embodiment.

Next, the structure of the threshold decision circuit block 40 is explained below using FIG. 11. The threshold decision circuit block 40 comprises a tentative setting circuit 41, a classification circuit 42, a contour extraction circuit 43, a contour comparison circuit 44, and a final setting circuit 45.

The standard image-setting circuit 32 is connected to the classification circuit 42. The standard-luminance image data is transmitted from the standard image-setting circuit 32 to the classification circuit 42. The classification circuit 42 is connected to the tentative setting circuit 41, also. The classification circuit 42 receives first tentative threshold data from the tentative setting circuit 41.

The tentative setting circuit 41 selects one value between 1 and 254 and sets the selected value to the first tentative threshold. The first tentative threshold corresponds to the first tentative threshold data to be transmitted to the classification circuit 42.

The classification circuit 42 compares each pixel data, which the standard-luminance image data, with the first tentative threshold. Pixels corresponding to pixel data, whose values are less than or equal to the first tentative threshold, are classified into first classified pixels. Pixels corresponding to pixel data, whose values are greater than the first tentative threshold, are classified into the second classified pixels.

Classification data corresponding to classification of every pixel is generated. The classification circuit 42 is connected to the contour extraction circuit 43, and the classification data is transmitted to the contour extraction circuit 43.

The standard image-setting circuit 32 is connected to the contour extraction circuit 43, also. The standard-luminance image data is transmitted from the standard image-setting circuit 32 to the contour extraction circuit 43, also.

Figure 12:
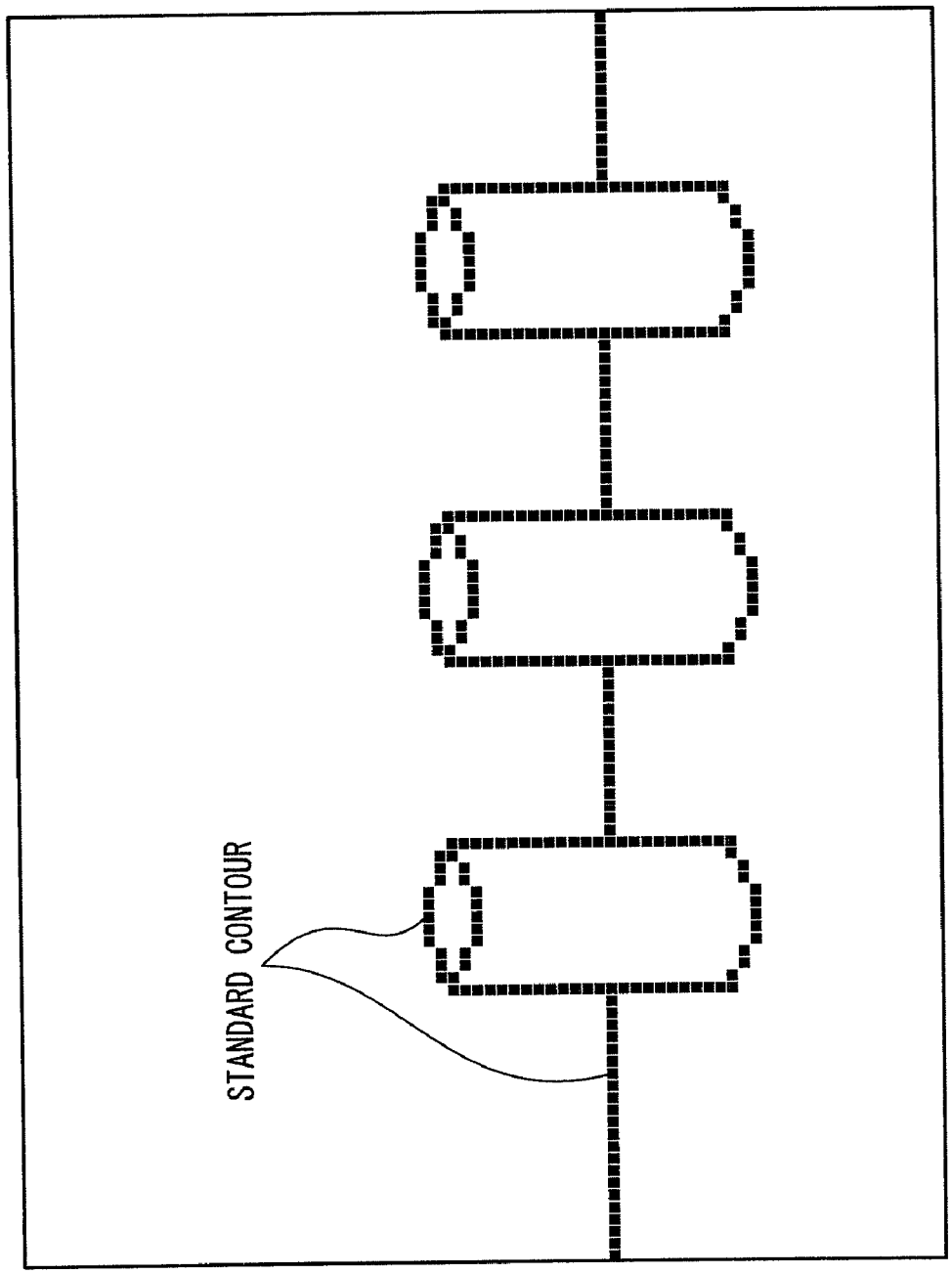
FIG. 12 illustrates the standard contour in an image corresponding to the standard-luminance image data.

The contour extraction circuit 43 extracts a contour of subjects in an image corresponding to the standard-luminance image data as a standard contour (see FIG. 12). The extraction of contour is carried out according to generally known methods of edge extraction.

The contour extraction circuit 43 generates standard contour data corresponding to locations of pixels extracted as the standard contour.

Figure 13:
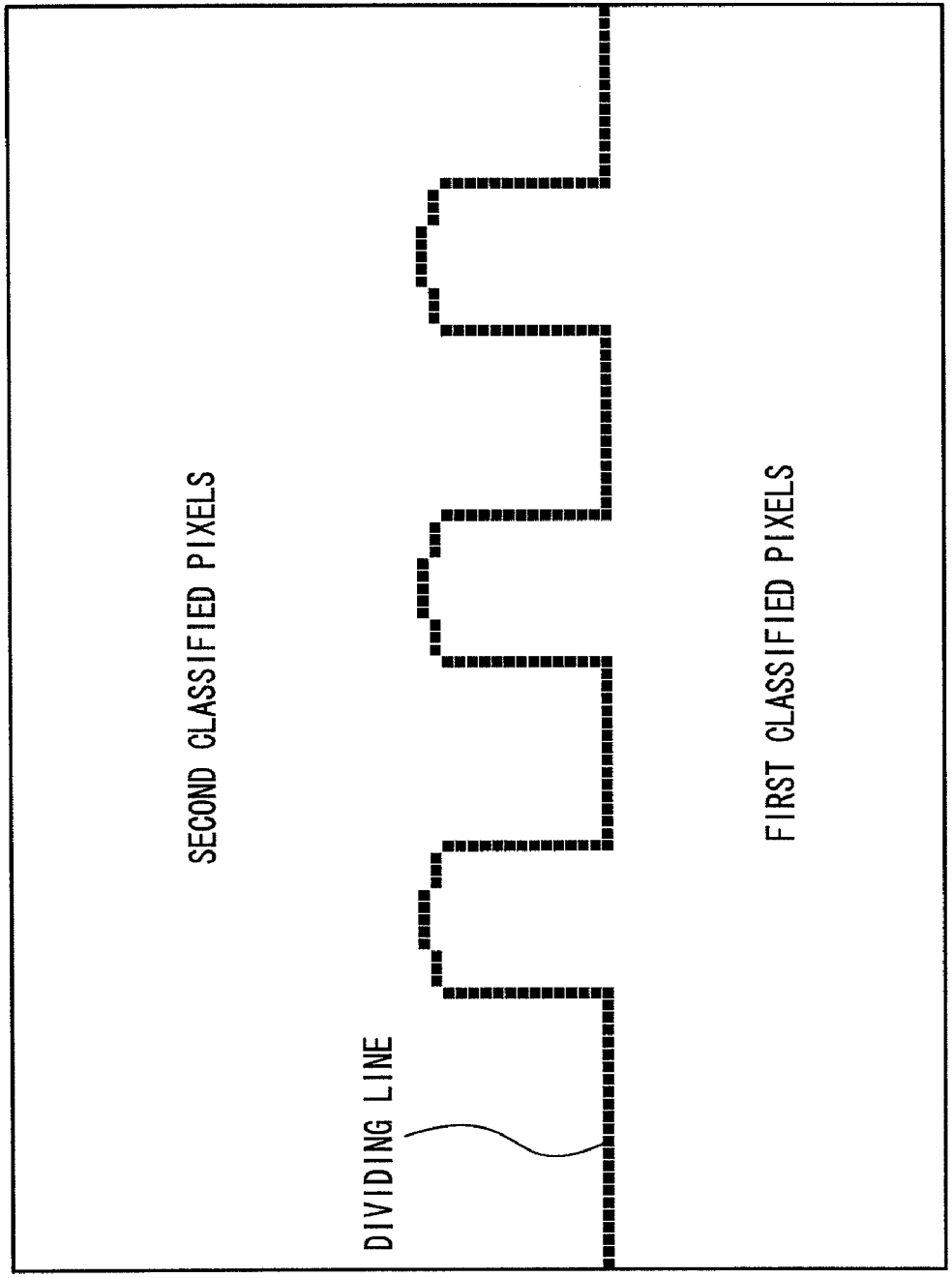
FIG. 13 illustrates the dividing line between the first and second classified neighboring pixels in an image corresponding to the standard-luminance image data.

In addition, the contour extraction circuit 43 detects locations neighboring to the first and second classified pixels on the basis of the classification data. A dividing line is formed by connecting the detected locations (see FIG. 13). The contour extraction circuit 43 detects the dividing line as a comparison contour. The contour extraction circuit 43 generates comparison contour data corresponding to locations of pixels extracted as the comparison contour.

The contour extraction circuit 43 is connected to the contour comparison circuit 44 (see FIG. 11), and the standard contour data and the comparison contour data are transmitted from the contour extraction circuit 43 to the contour comparison circuit 44. The contour comparison circuit 44 counts the number of pixels which are located on both the standard contour and the comparison contour as an accordance value on the basis of the standard contour data and the comparison contour data.

The contour comparison circuit 44 is connected to the final setting circuit 45. The accordance-value data is transmitted from the contour comparison circuit 44 to the final setting circuit 45. When receiving the accordance-value data, the final setting circuit 45 reads the first tentative threshold data from the tentative setting circuit 41. The final setting circuit 45 has a RAM. The final setting circuit 45 stores the received accordance-value data and the read first tentative threshold data with corresponding to each other in the RAM.

When storing accordance-value data and the first tentative threshold data, the final setting circuit 45 orders the tentative setting circuit 41 to select the other value than the values of the first tentative threshold data stored in the RAM between 1 and 254, and to set a new first tentative threshold to the selected value.

In addition, the final setting circuit 45 orders the classification circuit 42, the contour extraction circuit 43, and the contour comparison circuit 44 to work their functions above. Then, new accordance-value data corresponding to the newly set first tentative threshold is generated. The new setting of the first tentative threshold, the generation of the accordance-value data corresponding to the newly set first tentative threshold, and the storing the accordance-value data and the first tentative threshold are repeated until all the values between 1 and 254 are selected as the first tentative threshold.

When all the values between 1 and 254 are selected, the final setting circuit 45 detects the accordance values which are the largest and second largest among the accordance-value data stored in the RAM. Then, the final setting circuit 45 sets first and second conclusive thresholds to the first tentative thresholds corresponding to the largest and the second accordance values, respectively.

The final setting circuit 45 is connected to the synthesis circuit block 50. First and second threshold data corresponding to the first and second thresholds are transmitted from the final setting circuit 45 to the synthesis circuit block 50.

Figure 14:
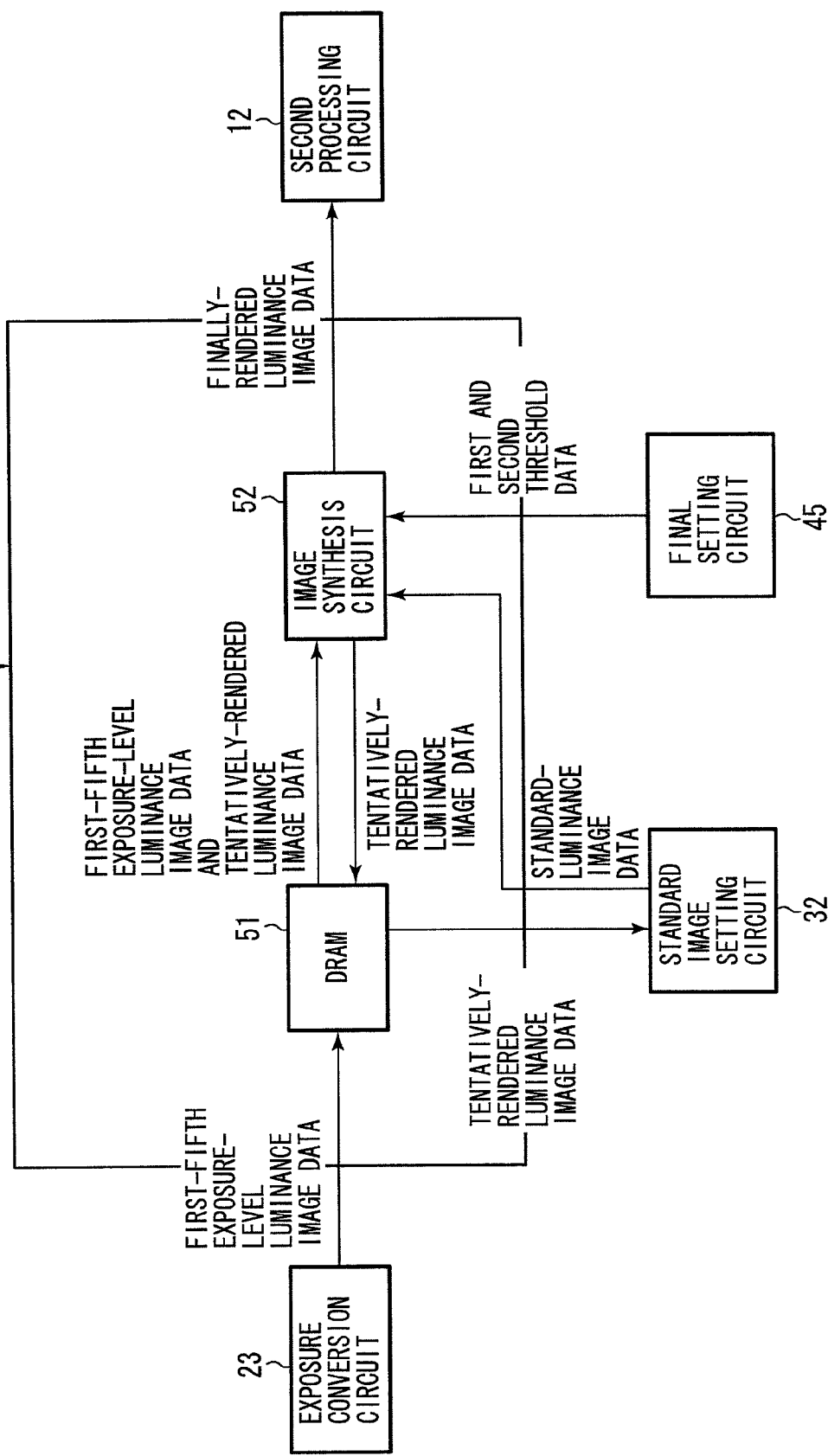
FIG. 14 is a block diagram showing the internal structure of the synthesis circuit block of the first and second embodiments.

Next, the structure of the synthesis circuit block 50 is explained below using FIG. 14. The synthesis circuit block 50 comprises a DRAM 51 and an image synthesis circuit 52.

As described above, to the synthesis circuit block 50, the first-fifth exposure-level luminance image data is transmitted from the exposure conversion circuit 23. The exposure conversion circuit 23 is connected to the DRAM 51, where the first-fifth exposure-level luminance image data is transmitted and stored. The DRAM 51 is connected to the image synthesis circuit 52. Data stored in the DRAM 51 can be transmitted to the image synthesis circuit 52.

As described above, to the synthesis circuit block 50, the first and second threshold data, and the standard-luminance image data are transmitted from the final setting circuit 45, and the standard image-setting circuit 32, respectively. The final setting circuit 45 and the standard image-setting circuit 32 are connected to the image synthesis circuit 52, which receives the first and second threshold data, and standard-luminance image data.

The image synthesis circuit 52 calculates of first-third mixture ratio values, smoothes the first-third mixture ratio values, normalizes the mixture ratio values, and generates the tentatively-rendered luminance image data on the basis of the smoothed first-third mixture ratio values.

First, the calculation of the first-third mixture ratio values is explained below. The first, second, and third mixture ratio values for the pixel arranged in xth column and yth row in the standard-luminance image data, hereinafter referred to as $Ev(x,y,1)$, $Ev(x,y,2)$, and $Ev(x,y,3)$, are calculated. The $Ev(x,y,1)$, $Ev(x,y,2)$, and $Ev(x,y,3)$ are calculated for all the pixels.

In order to calculate the first-third mixture ratio values, value of pixel data which the standard-luminance image data comprises is compared with the first and second conclusive thresholds.

If the value of the pixel data is less than the second conclusive threshold, the Ev(x,y,1), Ev(x,y,2), and Ev(x,y,3) are calculated by the following equation (1);

$$\begin{pmatrix} Ev(x,y,1) \\ Ev(x,y,2) \\ Ev(x,y,3) \end{pmatrix} = \begin{pmatrix} 0 \\ 0 \\ 1 \end{pmatrix} \quad (1)$$

If the value of the pixel data is greater than or equal to the second conclusive threshold and less than or equal to the first conclusive threshold, the Ev(x,y,1), Ev(x,y,2), and Ev(x,y,3) are calculated by the following equation (2);

$$\begin{pmatrix} Ev(x,y,1) \\ Ev(x,y,2) \\ Ev(x,y,3) \end{pmatrix} = \begin{pmatrix} 1 \\ 0 \\ 0 \end{pmatrix} \quad (2)$$

If the value of the pixel data is greater than the first conclusive threshold, the Ev(x,y,1), Ev(x,y,2), and Ev(x,y,3) are calculated by the following equation (3);

$$\begin{pmatrix} Ev(x,y,1) \\ Ev(x,y,2) \\ Ev(x,y,3) \end{pmatrix} = \begin{pmatrix} 0 \\ 1 \\ 0 \end{pmatrix} \quad (3)$$

Figure 15:
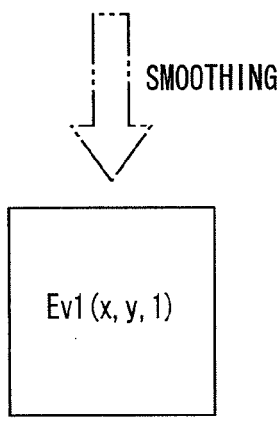
FIG. 15 illustrates the first mixture ratio value with first smoothing of the first mixture ratio value of a focused pixel using the first mixture ratio values of surrounding pixels.

When the first-third mixture ratio values for all the pixels are calculated, the calculated first-third mixture ratio values are smoothed according the following method. For smoothing the mixture ratio values, all the pixels are selected one by one to be the focused pixel. The Ev(x,y,1) is smoothed by averaging it with the first mixture ratio values of the surrounding pixels which arranged in five rows and five columns around the focused pixel, and calculated as a first mixture ratio value with first time smoothing, hereinafter referred to as Ev1(x,y,1). Accordingly, as shown in FIG. 15, the Ev1(x,y,1) is calculated by averaging the Ev(x−2,y−2,1), Ev(x−1,y−2,1), Ev(x,y−2,1), Ev(x+1,y−2,1), Ev(x+2,y−2,1), Ev(x−2,y−1,1), Ev(x−1,y−1,1), Ev(x,y−1,1), Ev(x+1,y−1,1), Ev(x+2,y−1,1), Ev(x−2,y,1), Ev(x−1,y,1), Ev(x,y,1), Ev(x+1,y,1), Ev(x+2,y,1), Ev(x−2,y+1,1), Ev(x−1,y+1,1), Ev(x,y+1,1), Ev(x+1,y+1,1), Ev(x+2,y+1,1), Ev(x−2,y+2,1), Ev(x−1,y+2,1), Ev(x,y+2,1), Ev(x+1,y+2,1), and Ev(x+2,y+2,1). The second and third mixture ratio values are smoothed, as in smoothing the first mixture ratio value.

When first time smoothing of the first-third mixture ratio values are completed, second time smoothing is started. In the second time smoothing, all the pixels are selected one by one to be the focused pixel again. The mixture ratio value with first time smoothing for the selected focused pixel is averaged with the first mixture ratio values with first time smoothing for the surrounding pixels arranged in five rows and five columns around the selected focused pixel. The second and third smoothed mixture ratio values for all the pixels are calculated as in the calculation of the first smoothed mixture ratio values.

When the first-third smoothed mixture ratio values for all the pixels are calculated, normalization of the mixture ratio values commences. By normalization, first-third normalized mixture ratio values are calculated such that the sums of the first-third normalized mixture ratio values for all the pixels are 1 and the ratios of the first-third normalized mixture ratio values are equal to those of the first-third smoothed mixture ratio values for all the pixels. For example, if the first, second, and third smoothed mixture ratio values for a pixel arranged in the xth column and yth row are 0.3, 0.7, and 0.2, respectively, the first-third smoothed mixture ratio values are normalized by dividing them by the sum of 1.2, then the first, second, and third normalized mixture ratio values, hereinafter referred to as Ev'(x,y,1), Ev'(x,y,2), and Ev'(x,y,3), are calculated to be 0.25, 0.58, and 0.17.

When the image synthesis circuit 52 calculates the first-third normalized mixture ratio values for all the pixels, the image synthesis circuit 52 reads the first-third exposure-level luminance image data from the DRAM51. The image synthesis circuit 52 generates tentatively-rendered pixel data for comprising the tentatively-rendered luminance image data on the basis of the first-third normalized mixture ratio values and the pixel data in the first-third exposure-level luminance image data. The tentatively-rendered pixel data is generated such that the value of the tentatively-rendered pixel data arranged in the xth column and yth row, hereinafter referred to as f(x,y), is calculated by the following equation (4) using the Ev'(x,y,1), Ev'(x,y,2), Ev'(x,y,3), and the values of the pixel data arranged in the xth column and yth row in the first, second, and third exposure-level luminance image data, hereinafter referred to as f(x,y,1), f(x,y,2), and f(x,y,3);

$$f(x,y)=Ev'(x,y,1) \times f(x,y,1)+Ev'(x,y,2) \times f(x,y,2)+Ev'(x,y,3) \times f(x,y,3) \quad (4)$$

In addition, the f(x,y) is calculated such that the word length of the tentatively-rendered pixel data is 8 by excluding the portions less than zero or rounding off.

For all the pixels, the tentatively-rendered pixel data is generated. The tentatively-rendered luminance image data is generated by generating the tentatively-rendered pixel data for all the pixels. The tentatively-rendered luminance image data is stored in the DRAM51.

When the tentatively-rendered luminance image data is store in the DRAM 51, the standard image-setting circuit 32 reads the tentatively-rendered luminance image data from the DRAM51. As described above, the standard image-setting circuit 32 sets a new standard-luminance image data to the tentatively-rendered luminance image data newly received.

The first and second threshold data are generated by transmitting the newly set standard-luminance image data to the threshold decision circuit block 40 and carrying out the same data processing as described above. The generated first and second threshold data are transmitted to the image synthesis circuit 52, as described above. In addition, the newly set standard-luminance image data is transmitted from the standard image-setting circuit 32 to the image synthesis circuit 52.

The image synthesis circuit 52 newly calculates the first-third normalized mixture ratio values on the basis of the newly received first and second threshold data and the newly received standard-luminance image data, as described above. When the first-third normalized mixture ratio values are calculated, the image synthesis circuit 52 reads the fourth and fifth exposure-level luminance image data and the tentatively-rendered luminance image data from the DRAM 51.

The image synthesis circuit 52 generates the finally-rendered pixel data which the finally-rendered luminance image data comprises. The finally-rendered pixel data is generated according to the same method as the tentatively-rendered pixel data with replacing the first, second, and third exposure-level luminance image data by the tentatively-rendered luminance image data, the fourth exposure-level luminance image data, and the fifth exposure-level luminance image data, respectively.

For all the pixels, the finally-rendered pixel data is generated. The finally-rendered luminance image data is generated by generating the finally-rendered pixel data for all the pixels.

The image synthesis circuit 52 is connected to the second processing circuit 12. The finally-rendered luminance image data is transmitted to the second processing circuit 12.

As described above, the second processing circuit 12 carries out predetermined data processing on the chrominance data component and the finally-rendered luminance image data which are transmitted from the first processing circuit 11 and the image synthesis circuit 52, respectively. The chrominance data component and the finally-rendered luminance image data are transmitted as the rendered image data to the monitor 65 and the card interface 66.

Next, the processes of HDR rendering, carried out by the image-processing unit 10 in the first embodiment, are explained using the flowcharts of FIGS. 16-22.

The processes of HDR rendering commences when an operational command for HDR rendering is input to the input block 67 by a user.

Figure 16:
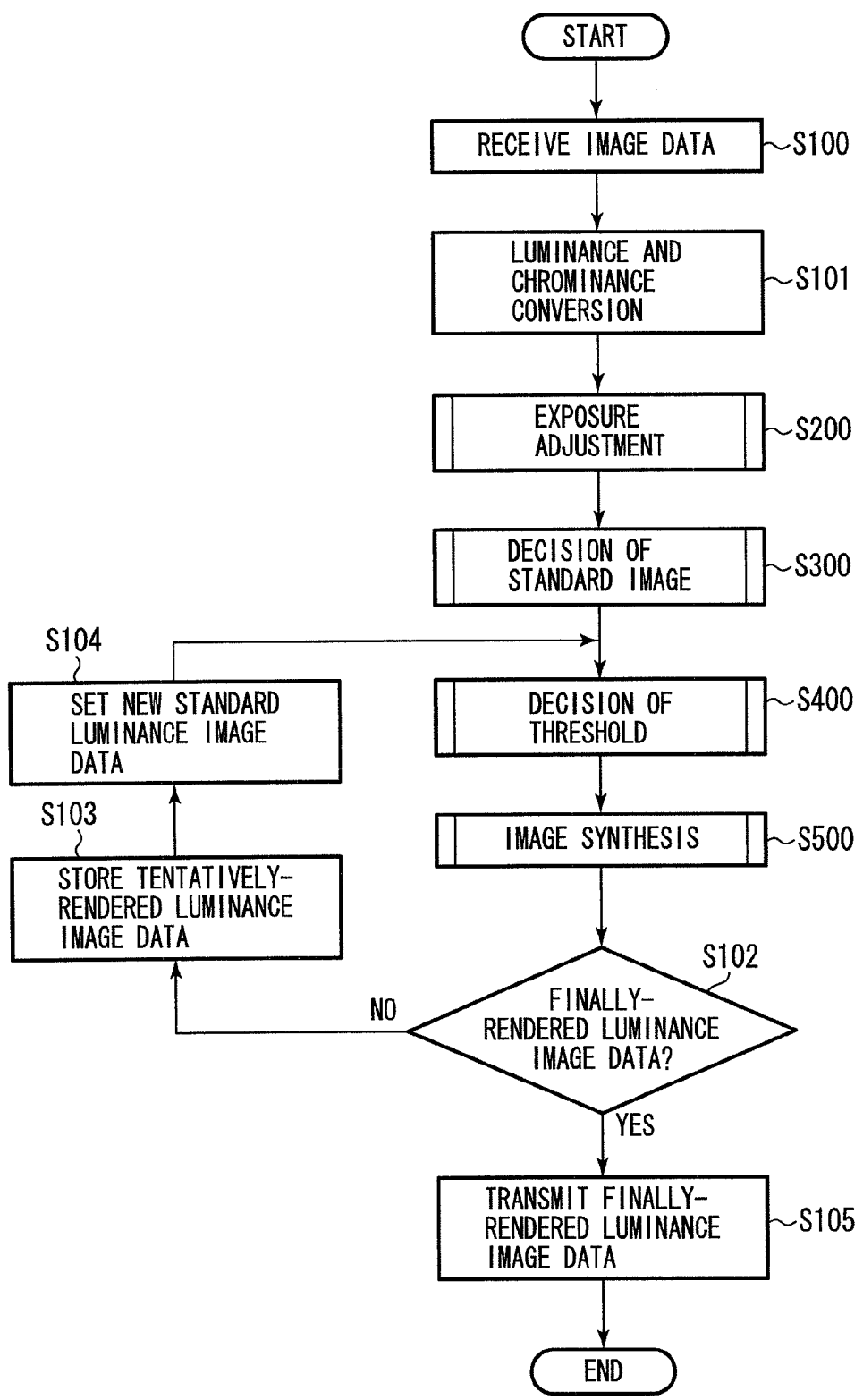
FIG. 16 is a flowchart illustrating the process of HDR rendering in the first embodiment.

As shown in FIG. 16, at step S100, the image-processing unit 10 receives the image data from the A/D converter 63. At the following step S101, the image-processing unit 10 carries out luminance/chrominance conversion processing on the received image data, and generates luminance data components and chrominance data components of pixel data corresponding to each pixel. After generating luminance data components and chrominance data components for all the pixels, the process proceeds to step S200.

At step S200, the image-processing unit 10 carries out subroutine of exposure adjustment. At subroutine of S200, as described later, the image-processing unit 10 generates the first-fifth exposure-level luminance image data on the basis of the luminance image data, which is the luminance data component. After generating the first-fifth exposure-level luminance image data, the process proceeds to step S300.

At step S300, the image-processing unit 10 carries out subroutine of decision of the standard image. At subroutine of S300, as described later, the image-processing unit 10 decides the standard-luminance image data which will use for following data processing. After decision of the standard-luminance image data, the process proceeds to step S400.

At step S400, the image-processing unit 10 carries out subroutine of decision of the threshold. At subroutine of S400, as described later, the first and second conclusive thresholds are decided on the basis of the standard-luminance image data decided at subroutine of S300. After decision of the first and second conclusive thresholds, the process proceeds to step S500.

At step S500, the image-processing unit 10 carries out subroutine of image synthesis. At subroutine of S500, as described later, the image-processing unit 10 generates the rendered luminance image data on the basis of the first-fifth exposure-level luminance image data and the first and second conclusive thresholds, which are decided at subroutines of S200 and S400, respectively. After generating the rendered luminance image data, the process proceeds to step S102.

At step S102, the image-processing unit 10 determines whether or not the rendered luminance image data generated at subroutine of S500 is the finally-rendered luminance image data. If it is not the finally-rendered luminance image data, the process proceeds to step S103. If it is the finally-rendered luminance image data, the process proceeds to step S105.

At step S103, the image-processing unit 10 stores the rendered luminance image data as the tentative rendered luminance image data in the DRAM 51. At the following step S104, the image-processing unit 10 sets the new standard-luminance image data to the tentative rendered luminance image data.

After decision of the new standard-luminance image data, the process returns to step S400. And then, the subroutines of S400 and S500 are repeated again. At the subroutine of S500, the image-processing unit 10 generates the rendered luminance image data as the finally-rendered luminance image data.

At step S105, the image-processing unit 10 transmits the rendered image data, which comprises the finally-rendered luminance image data and the chrominance data component, to the monitor 65 and the card interface 66. After transmitting the rendered image data, the processes of HDR rendering terminates.

Next, the subroutine of exposure adjustment is explained below using the flowcharts of FIGS. 17 and 18.

Figure 17:
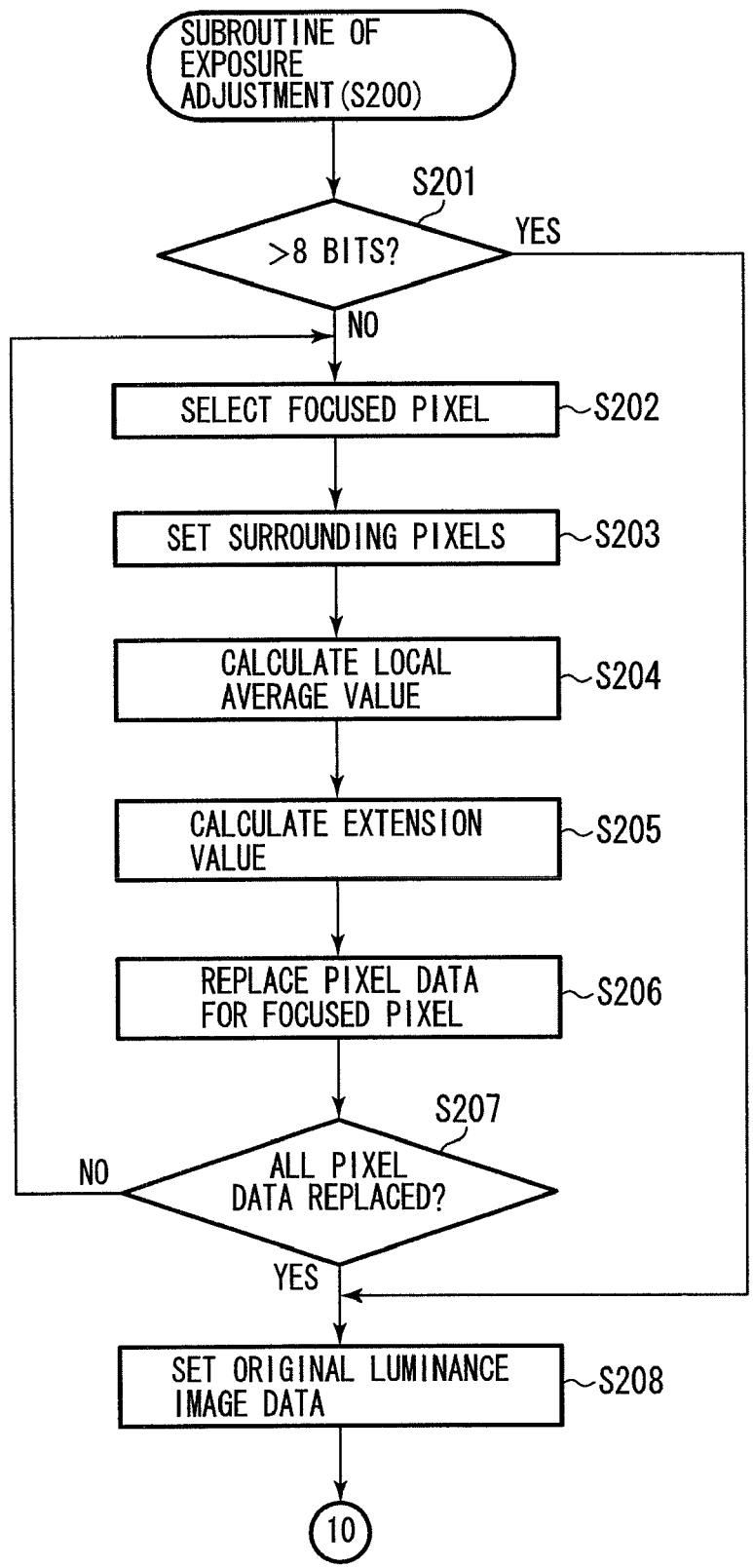
FIG. 17 is a first flowchart illustrating the exposure adjustment subroutine.
Figure 18:
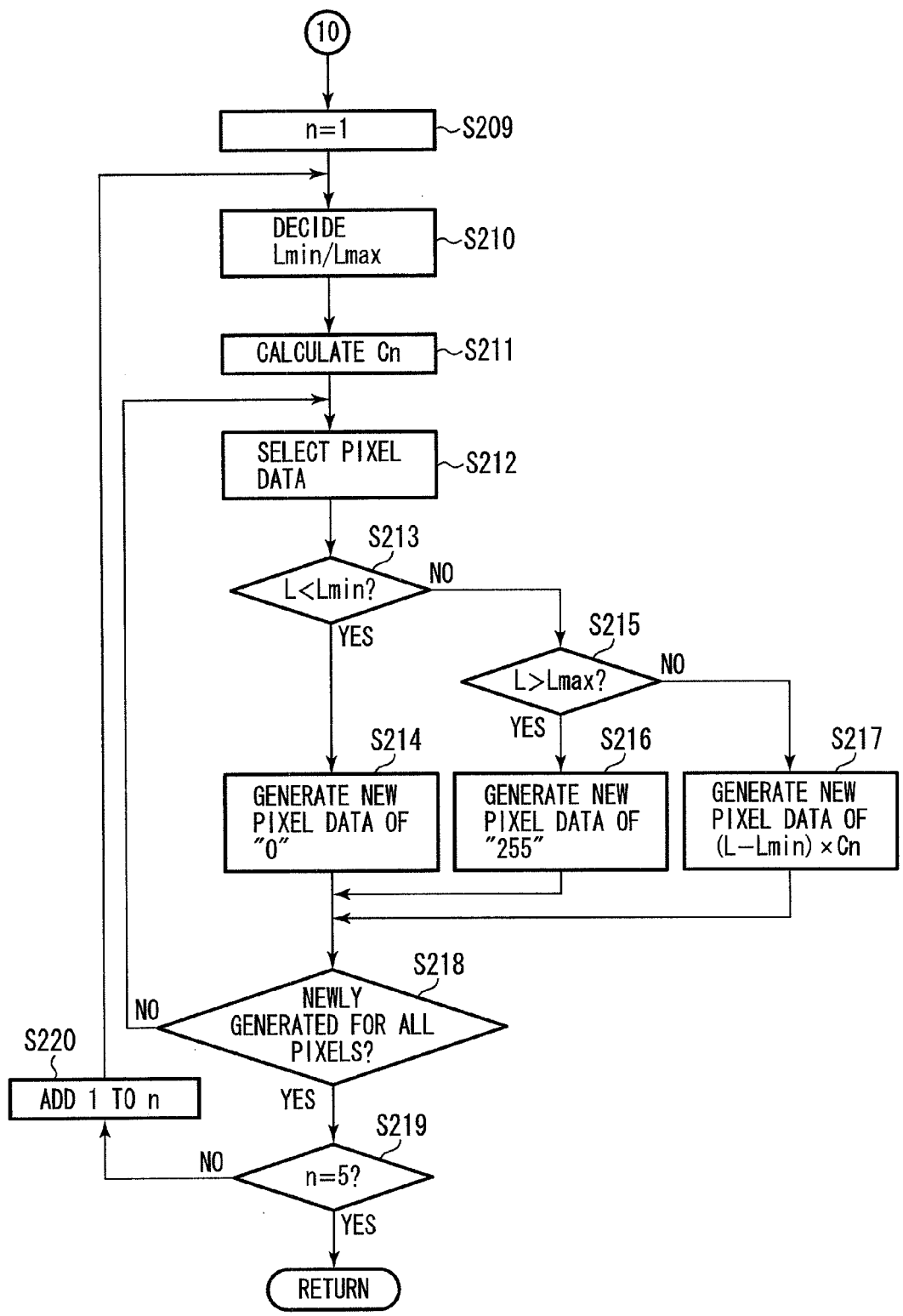
FIG. 18 is a second flowchart illustrating the exposure adjustment subroutine.

At step S201, the image-processing unit 10 determines whether or not the word length of the received image data is greater than 8 (see FIG. 17). If the word length is greater than 8, the process skips steps from S202 to S207, and proceeds to step S208. If the word length is less than or equal to 8, the process proceeds to step S202.

At step S202, the image-processing unit 10 selects one pixel corresponding to one pixel datum which the received luminance image data comprises to be the focused pixel. After selecting the focused pixel, the process proceeds to step S203.

At step S203, the image-processing unit 10 sets the surrounding pixels to 24 pixels arranged in five rows and five columns around the selected focused pixel. After setting of the surrounding pixels, the process proceeds to step S204.

At step S204, the image-processing unit 10 calculates the average of values of the pixel data corresponding to the focused pixel and all the surrounding pixels as the local average value. After calculation of the local average value, the process proceeds to step S205.

At step S205, the image-processing unit 10 calculates the extension value by multiplying the difference between the local average value and value for the focused pixel by the amplification coefficient. After calculation of the extension value, the process proceeds to step S206.

At step S206, the image-processing unit 10 calculates the sum of the extension value and the local average value. The image-processing unit 10 replaces pixel data whose value is the calculated sum with the original pixel data for the focused pixel. After replacement, the process proceeds to step S207.

At step S207, the image-processing unit 10 determines whether or not all the pixels corresponding to all the pixel data which the luminance image data comprises are selected to be the focused pixel and all of the corresponding pixel data are replaced. If there is a pixel corresponding to the pixel data which is not replaced yet, the process returns to step S202. And steps S202-S207 are repeated until all the pixel data is replaced. If all the pixel data is replaced, the process proceeds to step S208.

At step S208, the image-processing unit 10 sets the original luminance image data to luminance image data whose word length is determined to be greater than 8 at step S206, or luminance image data which comprises pixel data which is replaced at step S206. After setting of the original luminance image data, the process proceeds to step S209 (see FIG. 18).

At step S209, the image-processing unit 10 sets the number of exposure-level (represented by "n" in FIG. 18) to 1. After setting of the number of exposure-level, the process proceeds to step S210.

At step S210, the image-processing unit 10 decides the minimum and maximum luminance levels, hereinafter referred to as Lmin and Lmax, respectively, predetermined for the set number of exposure level. The Lmin and Lmax are values in the original luminance image data corresponding to zero and 255 in the set number of exposure-level luminance image data.

For the first luminance image data, $\alpha \times 2/5$ and $\alpha \times 3/5$ are predetermined as the Lmin and Lmax, respectively. For the second luminance image data, $\alpha \times 3/5$ and $\alpha \times 4/5$ are predetermined as the Lmin and Lmax, respectively. For the third luminance image data, $\alpha \times 1/5$ and $\alpha \times 2/5$ are predetermined as the Lmin and Lmax, respectively. For the fourth luminance image data, $\alpha \times 4/5$ and $\alpha$ are predetermined as the Lmin and Lmax, respectively. For the fifth luminance image data, zero and $\alpha \times 1/5$ are predetermined as the Lmin and Lmax, respectively. After decision of the Lmin and Lmax, the process proceeds to step S211.

At step S211, the image-processing unit 10 calculate a conversion coefficient, hereinafter referred to as Cn, for converting the original luminance image data into the set number of exposure-level luminance image data by the equation of $255/(\alpha/5)$. After calculation of the Cn, the process proceeds to step S212.

At step S212, the image-processing unit 10 selects one pixel datum which the original luminance image data. After selection of the pixel data, the process proceeds to step S213.

At step S213, the image-processing unit 10 determines whether or not the value of the selected pixel data (represented by "L" in FIG. 18) is less than the Lmin. If the value is less than the Lmin, the process proceeds to step S214. If the value is greater than or equal to the Lmin, the process proceeds to step S215.

At step S214, the image-processing unit 10 generates new pixel data whose value is zero as pixel data, corresponding to the pixel data selected at step S212, for the set number of exposure-level luminance image data. After generation of the new pixel data, the process proceeds to step S218.

At step S215, the image-processing unit 10 determines whether or not the value of the selected pixel data is greater than the Lmax. If the value is greater than the Lmax, the process proceeds to step S216. If the value is less than or equal to the Lmax, the process proceeds to step S217.

At step S216, the image-processing unit 10 generates new pixel data whose value is 255 as pixel data, corresponding to the pixel data selected at step S212, for the set number of exposure-level luminance image data. After generation of the new pixel data, the process proceeds to step S218.

At step S217, the image-processing unit 10 subtracts the Lmin from the value of the pixel data selected at step S212. In addition, the difference is multiplied by the Cn. Then, the image-processing unit 10 generates new pixel data whose value is the calculated number (=((the value of the selected pixel data)−Lmin)×Cn), corresponding to the pixel data selected at step S212, for the set number of exposure-level luminance image data. After generation of the new pixel data, the process proceeds to step S218.

At step S218, the image-processing unit 10 determines whether or not new pixel data in the set number of exposure-level luminance image data for all the pixels is generated. If new pixel data is not generated for all the pixels, the process returns to step S212. After that, steps S212-S218 are repeated until new pixel data is generated for all the pixel data which the set number of exposure-level luminance image data comprises. If new pixel data is generated for all the pixels, the generation of the set number of exposure-level luminance image data is completed, and the process proceeds to step S219.

At step S219, the image-processing unit 10 determines whether the set number of exposure level is 5. If the set number is not 5, the process proceeds to step S220. At step S220, the image-processing unit 10 adds 1 to the present set number. After addition of 1, the process returns to step S210.

After that, steps S210-S220 are repeated until the set number of exposure level is determined to be 5. If the set number of exposure level is determined to be 5, i.e. the first-fifth exposure-level luminance image data are generated, the subroutine of exposure adjustment terminates. As described above, after termination of the subroutine of exposure adjustment, the image-processing unit 10 starts to carry out the subroutine of decision of the standard image (see FIG. 16).

Figure 19:
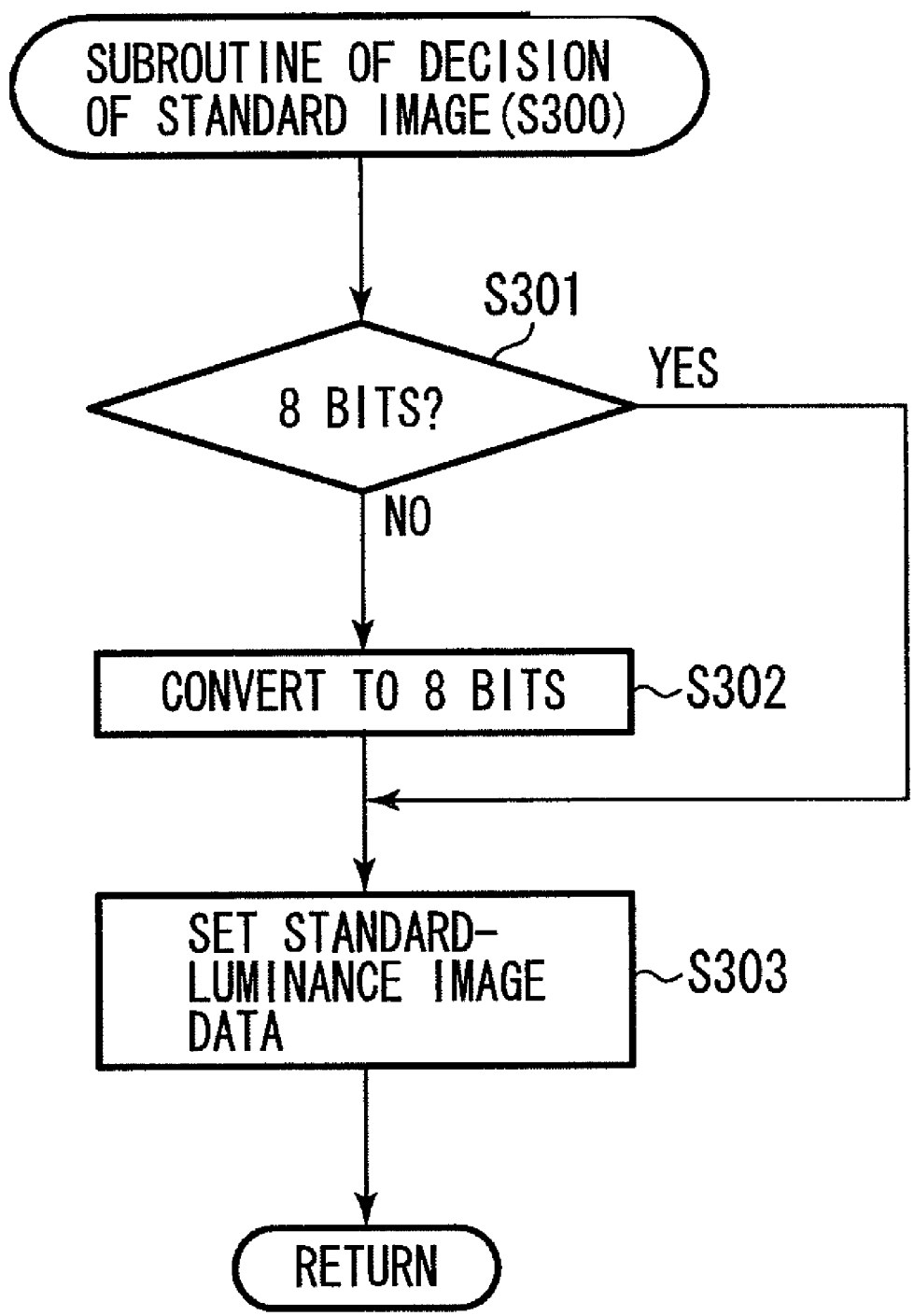
FIG. 19 is a flowchart illustrating the subroutine for deciding the standard image.

Next, the subroutine for deciding the standard image is explained below using the flowchart of FIG. 19.

At step S301, the image-processing unit 10 determines whether or not the word length of the luminance image data, which comprises the pixel data generated at step S101, is 8. If the word length is not 8, the process proceeds to step S302. If the word length is 8, the process skips step S302 and proceeds to step S303.

At step S302, the image-processing unit 10 converts the word length of the luminance image data to 8. Conversion to 8 bits is carried out by multiplying the luminance data components of all the pixel data by (256/(the maximum value of the pixel data generated at step S101)) and subtracting 1 from the product. After conversion to 8 bits, the process proceeds to step S303.

At step S303, the image-processing unit 10 sets the standard-luminance image data to the 8 bits of the luminance image data, which comprises the pixel data generated at step S101, or the luminance image data, whose word length is converted to 8 at step S302. Then, the subroutine for deciding the standard image terminates. As described above, after termination of the subroutine for deciding the standard image, the image-processing unit 10 starts to carry out the subroutine for deciding the threshold (see FIG. 16).

Figure 20:
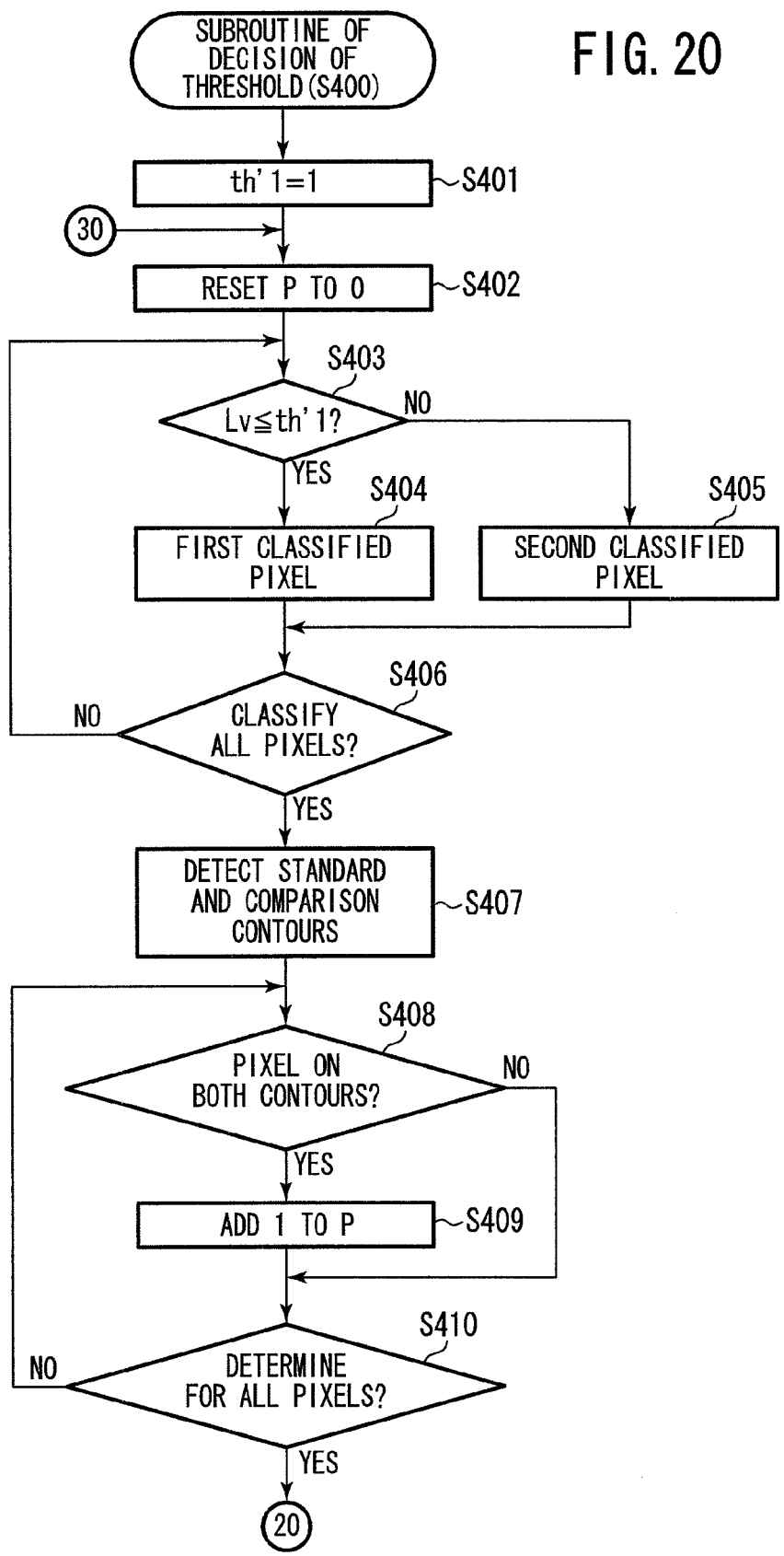
FIG. 20 is a first flowchart illustrating the subroutine for deciding the thresholds in the first embodiment.

Next, the subroutine for deciding the threshold is explained below using the flowchart of FIG. 20.

At step S401, the image-processing unit 10 sets the first tentative threshold (represented by "th'1" in FIGS. 20 and 21) to 1. After setting the first tentative threshold, the process proceeds to step S402.

At step S402, the image-processing unit 10 resets the accordance value (represented by "P" in FIGS. 20 and 21), to zero. After resetting the accordance value, the process proceeds to step S403.

At step S403, the image-processing unit 10 selects one pixel datum from among the standard-luminance image data excluding the pixel data corresponding to the pixels classified at step S404 or S405. In addition, the image-processing unit 10 determines whether or not the value of the selected pixel data (represented by "Lv" in FIG. 20) is less than or equal to the first tentative threshold. If the value is less than or equal to the first tentative threshold, the process proceeds to step S404. If the value is greater than the first tentative threshold, the process proceeds to step S405.

At step S404, the image-processing unit 10 classifies the pixel corresponding to the selected pixel data as the first classified pixel. On the other hand, at step S405, the image-processing unit 10 classifies the pixel corresponding to the selected pixel data as the second classification pixel. After classification at step S404 or S405, the process proceeds to step S406.

At step S406, the image-processing unit 10 determines whether or not the classification is carried out for all the pixels corresponding to all the pixel data in the standard-luminance image data. If any pixels remain unclassified, the process returns to step S403. After that, steps S403-S406 are repeated until all the pixels are classified. If all the pixels have been classified, the process proceeds to step S407.

At step S407, the image-processing unit 10 detects the standard contour and the comparison contour on the basis of the standard-luminance image data and the classification data relating to the first and second classified pixels, respectively. After detection of the standard and comparison contours, the process proceeds to step S408.

At step S408, the image-processing unit 10 selects one pixel corresponding to the pixel data which the standard luminance image comprises, excluding the once-selected pixels. In addition, the image-processing unit 10 determines whether or not the selected pixel is located on the standard and comparison contours. If the selected pixel is on both contours, the process proceeds to step S409. If the selected pixel is not on either contour, the process skips step S409 and proceeds to step S410.

At step S409, the image-processing unit 10 adds 1 to the present accordance value. After addition, the process proceeds to step S410.

At step S410, the image-processing unit 10 determines whether or not all the pixels corresponding to all the pixel data in the standard-luminance image data have been selected in order to determine whether the pixel is on both contours. If any pixels remain to be determined, the process returns to step S408. After that, steps S408-S410 are repeated until the determinations for all the pixels are carried out. If determinations have been made on all the pixels, then the process proceeds to step S411.

Figure 21:
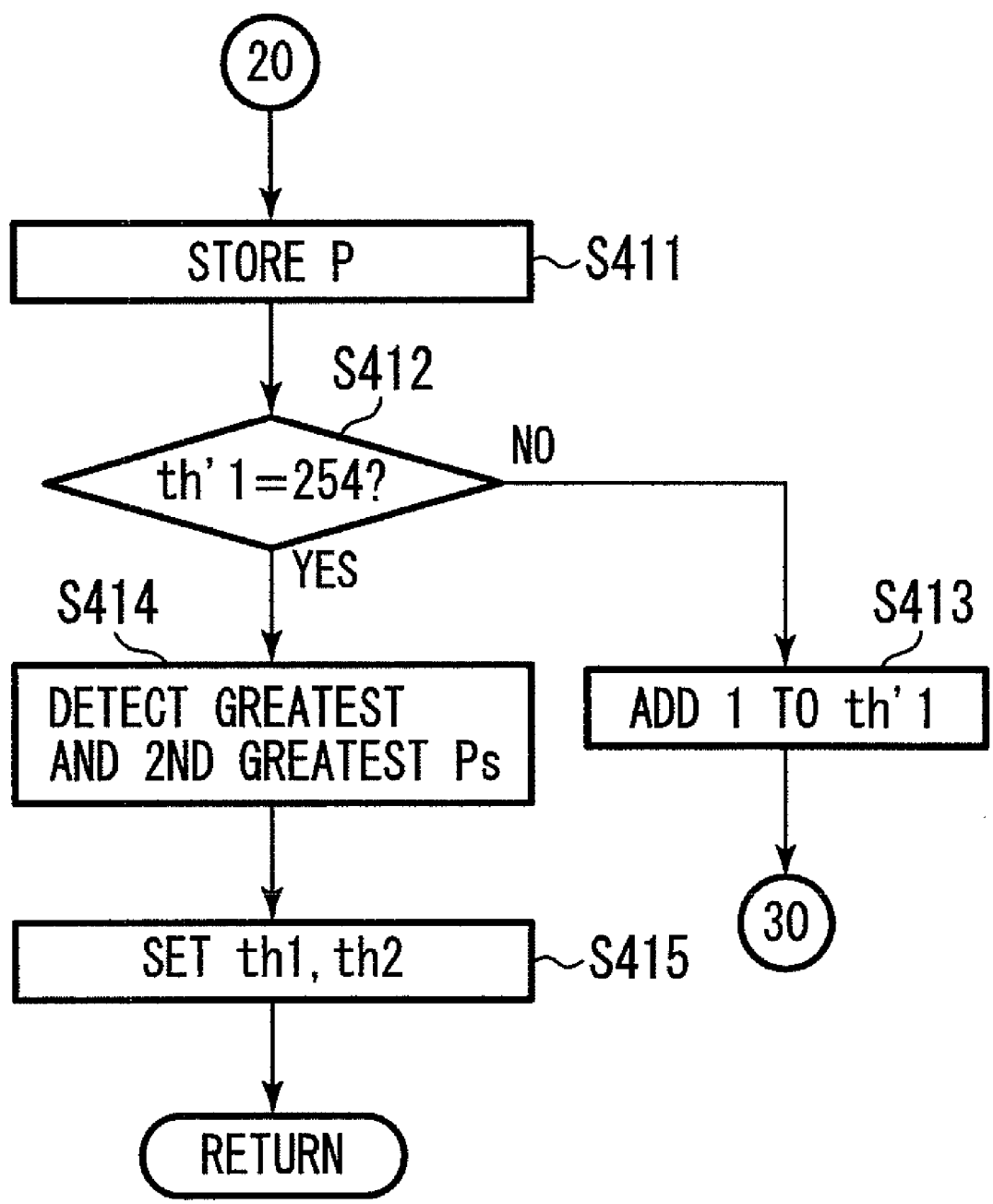
FIG. 21 is a second flowchart illustrating the subroutine for deciding the thresholds in the first embodiment.

As shown in FIG. 21, at step S411, the image-processing unit 10 stores the accordance-value data corresponding to the present accordance value related to the first tentative threshold data corresponding to the first tentative threshold presently set. After storing, the process proceeds to step S412.

At step S412, the image-processing unit 10 determines whether or not the first tentative threshold presently set is 254. If the first tentative threshold is not 254, the process proceeds to step S413, where the image-processing unit 10 adds 1 to the first tentative threshold presently set and sets a new first tentative threshold to it. Then, the process returns to step S402. After that, steps S402-S413 are repeated until the first tentative threshold becomes 254. If the first tentative threshold is 254, the process proceeds to step S414.

At step S414, the image-processing unit 10 detects the greatest and the second greatest accordance values among all the accordance values stored as the accordance-value data. After detection, the process proceeds to step S415.

At step S415, the image-processing unit 10 reads two first tentative threshold data stored with being related to the accordance-value data corresponding to the two accordance values detected at step S414. In addition, the image-processing unit 10 detects which first tentative thresholds corresponding to the read data are greater. In addition, the image-processing unit 10 sets the first conclusive threshold (represented by "th1" in FIGS. 21 and 22) to the greater first tentative threshold, and sets the second conclusive threshold (represented by "th2" in FIGS. 21 and 22) to the smaller first tentative threshold.

After setting the first and second conclusive thresholds, the subroutine for deciding the threshold terminates. As described above, after termination of the subroutine for deciding the threshold, the image-processing unit 10 starts to carry out the subroutine for image synthesis (see FIG. 16).

Figure 22:
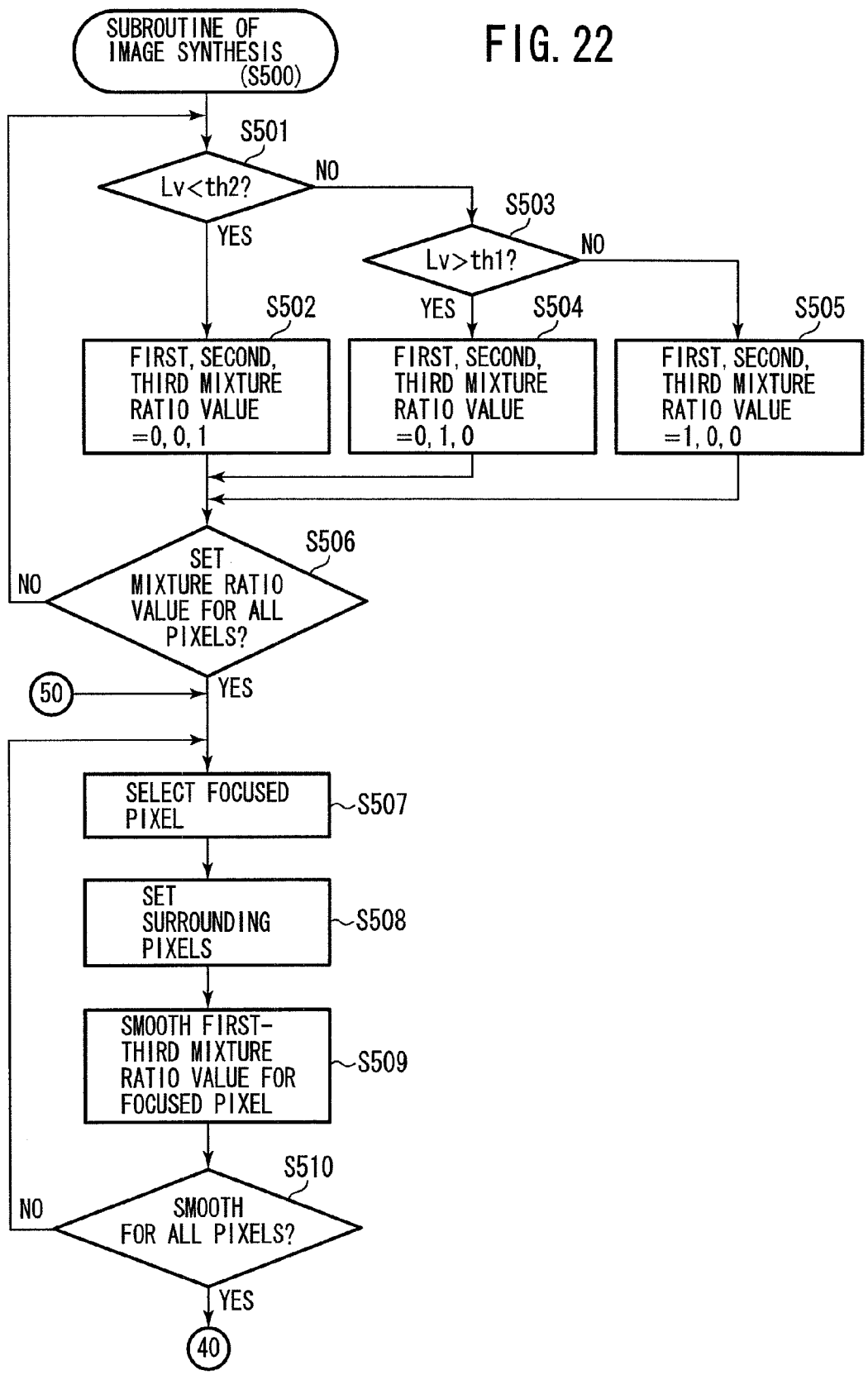
FIG. 22 is a first flowchart illustrating the subroutine of image synthesis.

Next, the subroutine for image synthesis is explained below using the flowcharts of FIGS. 22 and 23.

At step S501, the image-processing unit 10 selects one pixel datum from the standard-luminance image data excluding the pixel data for which the first-third mixture ratio values have not yet been decided. In addition, the image-processing unit 10 determines whether or not the value of the selected pixel data is less than the second conclusive threshold. If the value is less than the second conclusive threshold, the process proceeds to step S502. Unless the value is less than the second conclusive threshold, the process proceeds to step S503.

At step S503, the image-processing unit 10 determines whether or not the value is greater than the first conclusive threshold. If the value is greater than the first conclusive threshold, the process proceeds to step S504. If the value is less than or equal to the first threshold, the process proceeds to step S505.

At step S502, the image-processing unit 10 sets the first, second and third mixture ratio values for the selected pixel data, to 0, 0, and 1, respectively. At step S504, the image-processing unit 10 sets the first, second and third mixture ratio values for the selected pixel data, to 0, 1, and 0, respectively. At step S505, the image-processing unit 10 sets the first, second and third mixture ratio values for the selected pixel data, to 1, 0, and 0, respectively. After setting of the first-third mixture ratio values at steps S502, S504, or S505, the process proceeds to step S506.

At step S506, the image-processing unit 10 determines whether or not the first-third mixture ratio values have been set for all the pixel data which the standard-luminance image data comprises. If the setting is not carried out for all the pixel data, the process returns to step S501. After that, steps S501-S506 are repeated until the setting is carried out for all the pixel data. If the setting for all the pixel data has been completed, the process proceeds to step S507.

At step S507, the image-processing unit 10 selects one pixel, corresponding to pixel data which the standard-luminance image data comprises, to be the focused pixel. In addition, a focused pixel is selected, excluding the pixels which have undergone smoothing processing. After selection of the focused pixel, the process proceeds to step S508.

At step S508, the image-processing unit 10 sets the surrounding pixels to the 24 pixels arranged in five rows and five columns which surround the selected focused pixel. After setting of the surrounding pixels, the process proceeds to step S509.

At step S509, the image-processing unit 10 smoothes the first mixture ratio values of the focused pixel by substituting the average of the first mixture ratio values of the focused pixel and all the surrounding pixels for the original first mixture ratio value of the focused pixel. In addition, the image-processing unit 10 smoothes the second mixture ratio values of the focused pixel by substituting the average of second mixture ratio values of the focused pixel and all the surrounding pixels for the original second mixture ratio value of the focused pixel. In addition, the image-processing unit 10 smoothes the third mixture ratio values of the focused pixel by substituting the average of third mixture ratio values of the focused pixel and all the surrounding pixels for the original third mixture ratio value of the focused pixel. After smoothing the mixture ratio values of the focused pixel, the process proceeds to step S510.

At step S510, the image-processing unit 10 determines whether or not the mixture ratio values of all the pixels corresponding to the pixel data which the standard luminance image comprises, are smoothed. If the mixture ratio values for all the pixels are not smoothed, the process returns to step S507. After that, steps S507-S510 are repeated until the mixture ratio values for all the pixels are smoothed. If the mixture ratio values for all the pixels are smoothed, the process proceeds to step S511.

Figure 23:
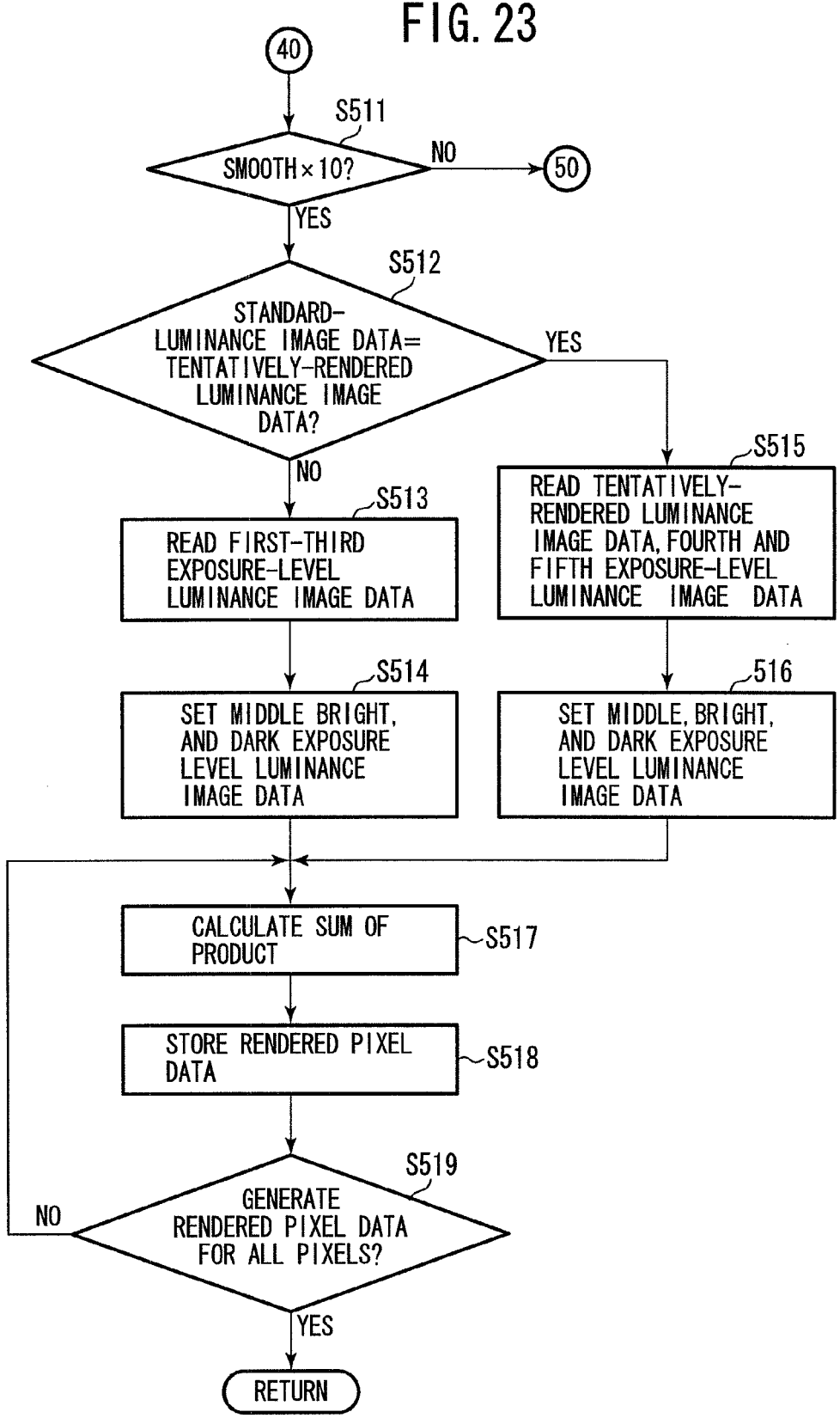
FIG. 23 is a second flowchart illustrating the subroutine of image synthesis.

As shown in FIG. 23, at step S511, the image-processing unit 10 determines whether or not the first-third mixture ratio values shall be smoothed 10 times. If 10 smoothings are not completed, the process returns to step S507. After that, steps S507-S511 are repeated until 10 smoothings have been completed. Once completed, the image-processing unit 10 calculates the first-third normalized mixture ratio values by normalizing the first-third mixture ratio values for all the pixels, and the process proceeds to step S512.

At step S512, the image-processing unit 10 determines whether or not the present standard-luminance image data is the tentatively-rendered luminance image data. If the present standard-luminance image data is not the tentatively-rendered luminance image data, the process proceeds to step S513. If the present standard-luminance image data is the tentatively-rendered luminance image data, the process proceeds to step S515.

At step S513, the image-processing unit 10 orders the image synthesis circuit 52 to read the first-third exposure-level luminance image data from the DRAM 51. At following step S514, the image-processing unit 10 sets middle, bright, and dark exposure-level luminance image data to the first, second, and third exposure-level luminance image data, respectively. After setting of the middle, bright, and dark exposure-level luminance image data, the process proceeds to step S517.

At step S515, the image-processing unit 10 orders the image synthesis circuit 52 to read the tentatively-rendered luminance image data, and the fourth and fifth exposure-level luminance image data from the DRAM 51. At following step S516, the image-processing unit 10 sets the middle, bright, and dark exposure-level luminance image data to the tentatively-rendered luminance image data, the fourth exposure-level luminance image data, and the fifth exposure-level luminance image data, respectively. After setting of the middle, bright, and dark exposure-level luminance image data, the process proceeds to step S517.

At step S517, the image-processing unit 10 multiplies the first normalized mixture ratio value with the value of the pixel data which the middle exposure-level luminance image data comprises. In addition, the image-processing unit 10 multiplies the second normalized mixture ratio value with the value of the pixel data which the bright exposure-level luminance image data comprises. In addition, the image-processing unit 10 multiplies the third normalized mixture ratio value with the value of the pixel data which the dark exposure-level luminance image data comprises. In addition, the image-processing unit 10 calculates the sum of the products calculated in the above three multiplications. And after calculation of the sum, the process proceeds to step S518.

At step S518, the image-processing unit 10 stores pixel data the sum of whose value was calculated at step S517, in the DRAM 51. The pixel data is then stored as rendered pixel data which the rendered luminance image data subsequently comprises. Then, after storing the rendered pixel data, the process proceeds to step S519.

At step S519, the image-processing unit 10 determines whether or not the rendered pixel data for all the pixels are to be stored. If the rendered pixel data for all the pixels is not stored, the process returns to step S517. After that, steps S517-S519 are repeated until the rendered pixel data for all the pixels has been stored. If the rendered pixel data for all the pixels has been stored, the subroutine for image synthesis terminates and the process returns to step S102.

In the first embodiment above, it is possible to carry out HDR rendering without multiple captures. Therefore, even if a subject is moving, blur will be reduced in a resulting HDR image.

In the first embodiment above, the word length of the luminance data component is increased such that the difference in values between the focused pixel and the surrounding pixels is increased by multiplying the original difference by the amplification coefficient. Due to this increase in resolution, it is possible to produce fine transitions in brightness as compared to the method of simply multiplying the luminance data component by a constant gain. Consequently, a subject whose optical image is too bright or too dark may be displayed clearly and in detail.

In the first embodiment above, the first and second conclusive thresholds, for determining which to use from among the first-fifth exposure-level luminance image data for a portion of the whole HDR image, are chosen on the basis of the standard contour. Because subject contours and the dividing lines between two different exposure-level luminance images, (corresponding to different exposure-level luminance image data), are made to coincide thanks to the threshold explained above, such dividing lines can be hard to see in the HDR image.

Next, an image-processing unit of the second embodiment is explained. The primary difference between the second embodiment and the first embodiment is that the image-processing unit is mounted in an endoscope processor and carries out HDR rendering for a dynamic image. The second embodiment is explained mainly with reference to the structures that differ from those of the first embodiment. Here, the same index numbers are used for the structures that correspond to those of the first embodiment.

Figure 24:
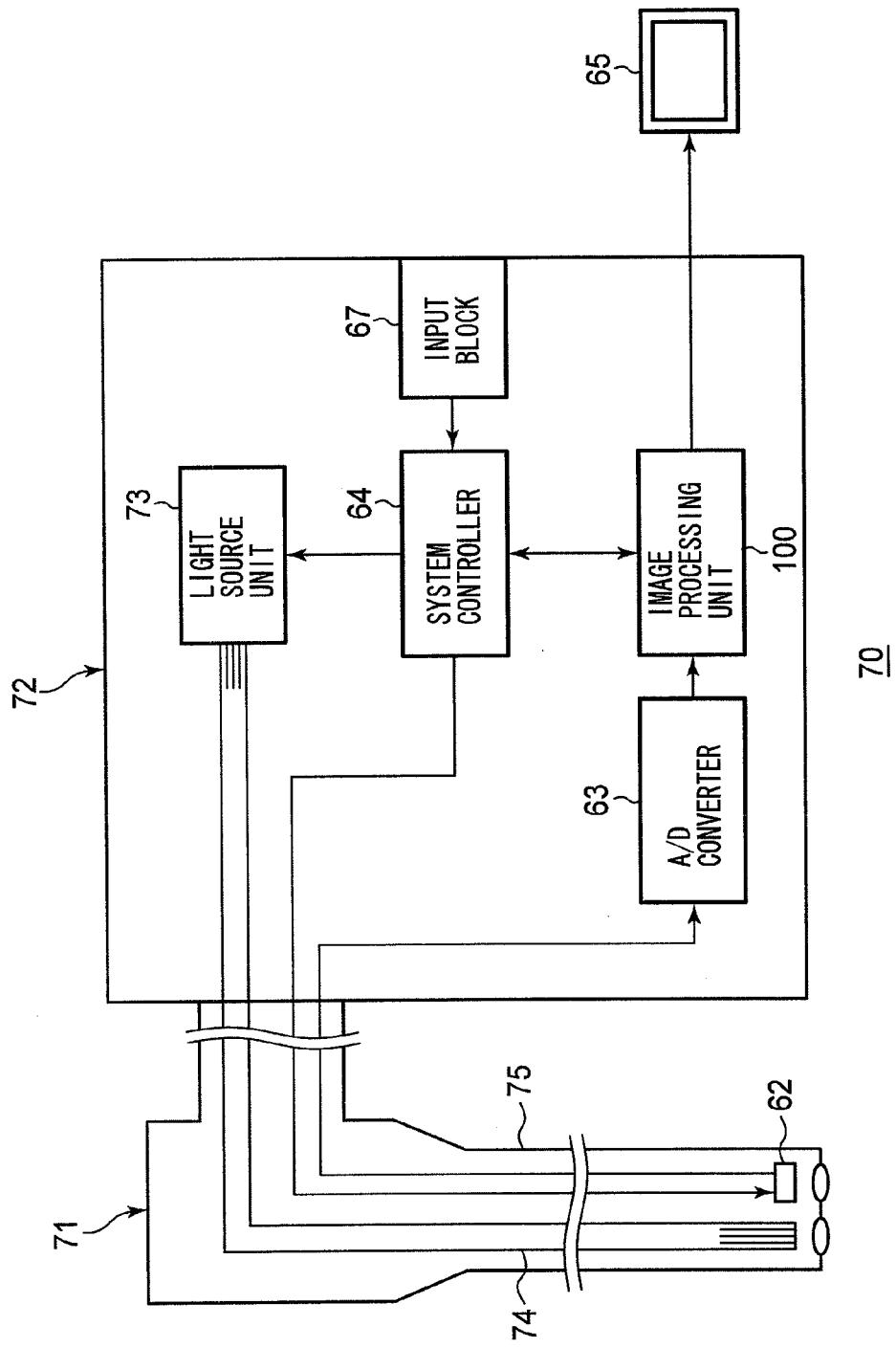
FIG. 24 is a block diagram showing the internal structure of an endoscope system having an endoscope processor having an image-processing unit of a second embodiment.

As shown in FIG. 24, an endoscope system 70 comprises an electronic endoscope 71, an endoscope processor 72, and a monitor 65.

Light emitted by a light source unit 73 mounted in the endoscope processor 72 is transmitted to a head end of an insertion tube 75 of the electronic endoscope 71 via a light guide 74. The transmitted light is shone on subjects in a peripheral area of the head end of the insertion tube 75. An optical image on the basis of reflected light of the subject illuminated by the light is captured by an imaging device 62 mounted at the head end of the insertion tube 75.

The imaging device 62 generates an image signal corresponding to the received optical image at every sampling time of 1/30 second. The image signal is digitized and converted into 8 bits of image data by the A/D converter 63 mounted in the endoscope processor 72.

The image data is transmitted to the image-processing unit 100. The image-processing unit 100 carries out predetermined data processing on the received image data. In addition, the image-processing unit 100 can carry out the same HDR rendering as in the first embodiment. The image data, which has undergone predetermined data processing, is transmitted to the monitor 65, where an image corresponding to the transmitted image data is displayed. The image data is received by the monitor 65 every 1/30 second. A dynamic image is displayed on the monitor by changing the image displayed every 1/30 second.

The image-processing unit 100 is connected to the system controller 64. The system controller 64 controls image processing of the image-processing unit 100, as in the first embodiment. The system controller 64 is connected to other components of the endoscope system 70, and controls the operations of the components. In addition, the system controller 64 is connected to the input block 67. The system controller 64 controls each component on the basis of an operational command input by a user to the input block 67.

Figure 25:
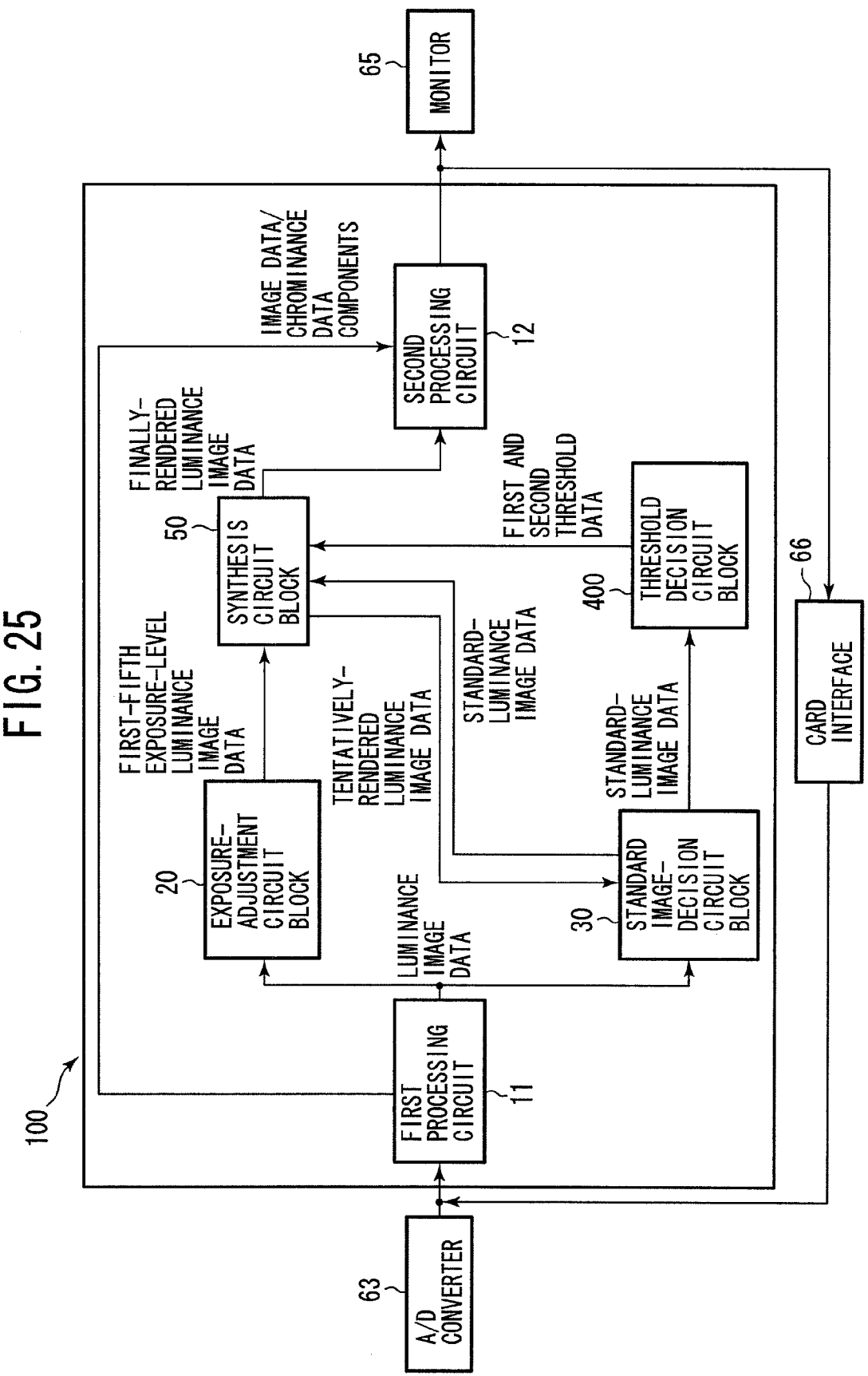
FIG. 25 is a block diagram showing the internal structure of the image-processing unit of the second embodiment.

The structure of the image-processing unit 100 is explained using FIG. 25. The image-processing unit 100 comprises a first processing circuit 11, an exposure-adjustment circuit block 20, a standard image-decision circuit block 30, a threshold decision circuit block 400, a synthesis circuit block 50, and a second processing circuit block 12.

The image data transmitted from the A/D converter 63 is received by the first processing circuit 11, as in the first embodiment. The structures and the functions of the first and second processing circuits are the same as those of the first embodiment. Accordingly, the first processing circuit 11 carries out predetermined data processing including luminance/chrominance conversion processing on the received image data. In addition, unless HDR rendering is carried out, the image data is transmitted from the first processing circuit 11 to the second processing circuit 12, where carries out predetermined data processing.

The first processing circuit 11 is connected to the exposure-adjustment circuit block 20 and the standard image-decision circuit block 30, as in the first embodiment. If HDR rendering is carried out, the chrominance data component of the image data is transmitted to the second processing circuit 12, and the luminance data component of the image data, which is luminance image data, is transmitted to the exposure-adjustment circuit block 20 and the standard image-decision circuit block 30.

The exposure-adjustment circuit block 20 generates the first-fifth exposure-level luminance image data on the basis of the received luminance image data, as in the first embodiment. In addition, the exposure-adjustment circuit block 20 is connected to the synthesis circuit block 50 and the first-fifth exposure-level luminance image data is transmitted to the synthesis circuit block 50, as in the first embodiment.

The standard image-decision circuit block 30 decides the standard-luminance image data, as in the first embodiment. The standard image-decision circuit block 30 is connected to the threshold setting block 400 and the synthesis circuit block 50, and the decided standard-luminance image data is transmitted to the threshold decision circuit block 400 and the synthesis circuit block 50, as in the first embodiment.

The threshold decision circuit block 400 decides the first and second conclusive thresholds. As explained later, the first and second conclusive thresholds are decided on the basis of conclusive thresholds decided for previous frames of image data, differently from the first embodiment. The threshold decision circuit block 400 is connected to the synthesis circuit block 50, and the decided first and second threshold data is transmitted to the synthesis circuit block 50, as in the first embodiment.

The synthesis circuit block 50 generates finally-rendered luminance image data on the basis of the first-fifth exposure-level luminance image data, the standard-luminance image data, and the first and second threshold data, as in the first embodiment. The synthesis circuit block 50 is connected to the second processing circuit 12, and the finally-rendered luminance image is transmitted to the second processing circuit 12, as in the first embodiment.

Next, the structure and function of the threshold decision circuit block 400, which are different from those in the first embodiment, are explained. In addition, the internal structures and functions of the exposure-adjustment circuit block 20, the standard image-decision circuit block 30, and the synthesis circuit block 50 are the same as those of the first embodiment.

Figure 26:
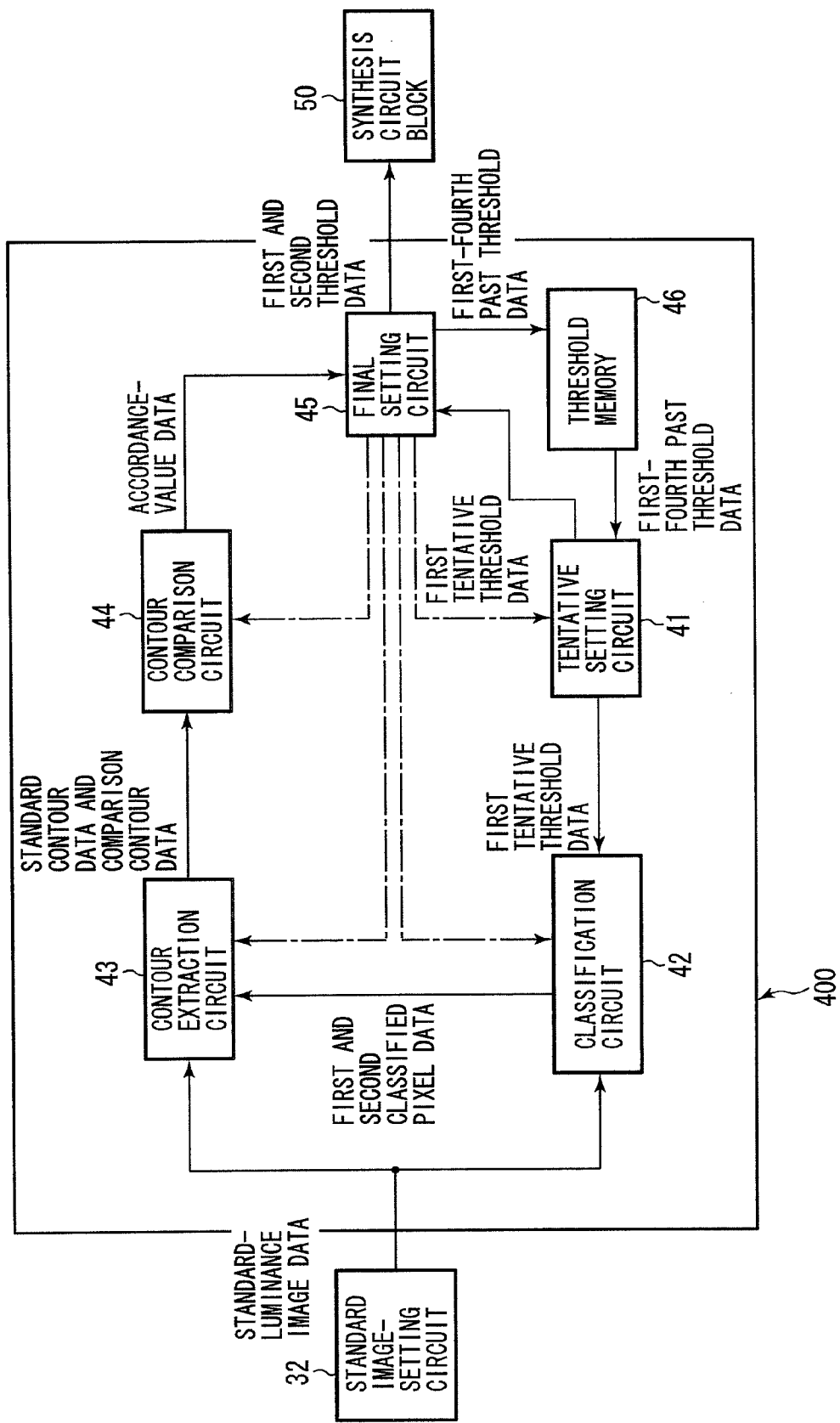
FIG. 26 is a block diagram showing the internal structure of the threshold decision circuit block of the second embodiment.

As shown in FIG. 26, the threshold decision circuit block 400 comprises the tentative setting circuit 41, the classification circuit 42, the contour extraction circuit 43, the contour comparison circuit 44, and the final setting circuit 45, as in the first embodiment. In addition, the threshold decision circuit block 400 comprises a threshold memory 46, differently from the first embodiment.

The threshold memory 46 is connected to the tentative setting circuit 41 and the final setting circuit 45. In the threshold memory 46, as described later, first-fourth past threshold data is stored. In addition, when the endoscope processor 70 is switched on, the threshold memory 46 is reset, and then the past threshold data stored in the threshold memory is deleted.

If the first-fourth past threshold data is not stored in the threshold memory 46, the tentative setting circuit 41 selects one value between 1 and 254, and sets the first tentative threshold to the selected value, as in the first embodiment.

The classification circuit 42 classifies all pixel data into the first or second classified pixel on the basis of the first tentative threshold, as in the first embodiment. The contour extraction circuit 43 extracts the standard and comparison contours, as in the first embodiment. The contour comparison circuit 44 calculates the accordance value, as in the first embodiment. The final setting circuit 45 decides the first and second conclusive thresholds on the basis of the first tentative threshold, as in the first embodiment. In addition, the first and second threshold data, which correspond to the first and second conclusive thresholds, are transmitted to the synthesis circuit block 50, as in the first embodiment.

When the final setting circuit 45 decides the first and second conclusive thresholds, the first and second threshold data is transmitted also to the threshold memory 46, and the first and second threshold data is stored in the threshold memory 46 as first and second past threshold data, respectively, in contrast to the first embodiment.

In addition, if the present standard-luminance image data is the tentatively-rendered luminance image data, then the first and second threshold data is stored in the threshold memory 46 as third and fourth past threshold data, respectively.

In addition, the first and second conclusive thresholds are calculated separately for different frames of luminance image data. In the threshold memory 46, five sets of the first-fourth past threshold data for previous five frames of image data is stored.

If the past threshold data is stored in the threshold memory 46, the first and the second conclusive thresholds is decided according to a method different from that of the first embodiment, as explained below.

When the standard-luminance image data is set to the luminance image data transmitted from the 8-bit conversion circuit, the tentative setting circuit 41 reads the first past threshold data for previous five frames of luminance image data from the threshold memory 46. The tentative setting circuit 41 calculates the weighted average of the first past thresholds for previous five frames as the first tentative threshold. The weight to be multiplied is decided to be larger as the frame of the luminance image data is near to present.

For example, the first tentative threshold is calculated by the following equation (5);

$$th'1 = (a \times th1f1 + b \times th1f2 + c \times th1f3 + d \times th1f4 + e \times th1f5)/(a+b+c+d+e) \quad (5)$$

In the above equation (5), the th'1 is the first tentative threshold, the th1f1-th1f5 are the first past thresholds for the previous first-fifth frames of the luminance image data, and the a, b, c, d, and e are weights with meeting the following inequality (6)

$$a \geq b \geq c \geq d \geq e \quad (6)$$

When the tentative setting circuit 41 decides the first tentative threshold, the classification circuit 42 classifies all pixel data into the first or second classified pixel on the basis of the first tentative threshold, as in the first embodiment. The contour extraction circuit 43 extracts the standard and comparison contours, as in the first embodiment. The contour comparison circuit 44 calculates the accordance value, as in the first embodiment.

The final setting circuit 45 stores the accordance-value data calculated by the contour comparison circuit 44 and the first tentative threshold data with corresponding to each other in the RAM, in the first embodiment. However, differently from the first embodiment, when the final setting circuit 45 stores the accordance-value data and the first tentative threshold data in the RAM, the final setting circuit 45 varies the value of the first tentative threshold, which is stored in the RAM at beginning, in the range of ±5, and sets the new first tentative threshold to the varied value.

The final setting circuit 45 orders the classification circuit 42, the contour extraction circuit 43, and the contour comparison circuit 44 to work their functions above such that accordance-value data for the new first tentative threshold is generated, as in the first embodiment. The final setting circuit 45 stores newly generated accordance-value data in the RAM. Then, the final setting circuit 45 orders the tentative setting circuit 41 to vary the value of the first tentative threshold, which is stored in the RAM at beginning, in the range of ±5. After that, the final setting circuit 45 repeats to generate and store accordance value corresponding to the first tentative threshold until accordance values for all values in the range of ±5 from the first tentative threshold stored in the RAM at beginning are calculated.

The final setting circuit 45 sets the new first conclusive threshold to the first tentative threshold corresponding to the accordance value which is the highest among those stored in the RAM. When the first conclusive threshold is newly set, the first threshold data is transmitted to the synthesis circuit block 50. In addition, the first threshold data is transmitted to the threshold memory 46, where the first threshold data is stored as the new first past threshold.

When the first threshold data is transmitted to the synthesis circuit block 50, the tentative setting circuit 41 reads the second past threshold data for previous five frames of luminance image data from the threshold memory 46. After that, each component of the threshold decision circuit block 400 carry out the same operations as the decision of the first conclusive threshold, and the first tentative threshold value corresponding to the accordance value which is the highest among those stored in the RAM to the new second conclusive threshold.

When the second conclusive threshold is newly set, the second threshold data is transmitted to the synthesis circuit block 50. In addition, the second threshold data is transmitted to the threshold memory 46, where the second threshold data is stored as the new second past threshold.

The synthesis circuit block 50 generates the tentatively-rendered luminance image data on the basis of the first-third exposure-level luminance image data and the first and second threshold data, as in the first embodiment.

The generated tentatively-rendered luminance image data is transmitted to the standard image-decision circuit block 30, as in the first embodiment. The new standard-luminance image data is set to the transmitted tentatively-rendered luminance image data at the standard image-decision circuit block 30.

When the new standard-luminance image data is set to the tentatively-rendered luminance image data, the tentative setting circuit 41 reads the third past threshold data for previous five frames of luminance image data from the threshold memory 46. After that, each component of the threshold decision circuit block 400 carry out the same operations as described above, and the first tentative threshold value corresponding to the accordance value which is the highest among those stored in the RAM to the new first conclusive threshold.

When the first conclusive threshold is newly set, the first threshold data is transmitted from the threshold decision circuit block 400 to the synthesis circuit block 50. In addition, the first threshold data is transmitted to the threshold memory 46, where the first threshold data is stored as the new third past threshold.

When the first threshold data is transmitted to the synthesis circuit block 50, the tentative setting circuit 41 reads the fourth past threshold data for previous five frames of luminance image data from the threshold memory 46. After that, each component of the threshold decision circuit block 400 carry out the same operations as described above, and the first tentative threshold value corresponding to the accordance value which is the highest among those stored in the RAM to the new second conclusive threshold.

When the second conclusive threshold is newly set the second threshold data is transmitted to the synthesis circuit block 50. In addition, the second threshold data is transmitted to the threshold memory 46, where the second threshold data is stored as the new fourth past threshold.

The synthesis circuit block 50 generates the finally-rendered luminance image data on the basis of the tentatively-rendered luminance image data, fourth and fifth exposure-level luminance image data, and the first and second threshold data, as in the first embodiment. The generated finally-rendered luminance image data is transmitted to the second processing circuit 12, as in the first embodiment.

The second processing circuit 12 carries out predetermined data processing on the chrominance data component and the finally-rendered luminance image data which are transmitted from the first processing circuit 11 and the image synthesis circuit 52, respectively, as in the first embodiment. The chrominance data component and the finally-rendered luminance image data are transmitted as the rendered image data to the monitor 65.

Next, the processes of HDR rendering, carried out by the image-processing unit 100 in the second embodiment, are explained using the flowcharts of FIGS. 27-30.

The processes of HDR rendering commences when an operational command for HDR rendering is input to the input block 67 by a user under the mode for observation of some subjects. The processes of HDR rendering is completed when an operational command for suspending HDR rendering is input or the mode for observation is stopped.

Figure 27:
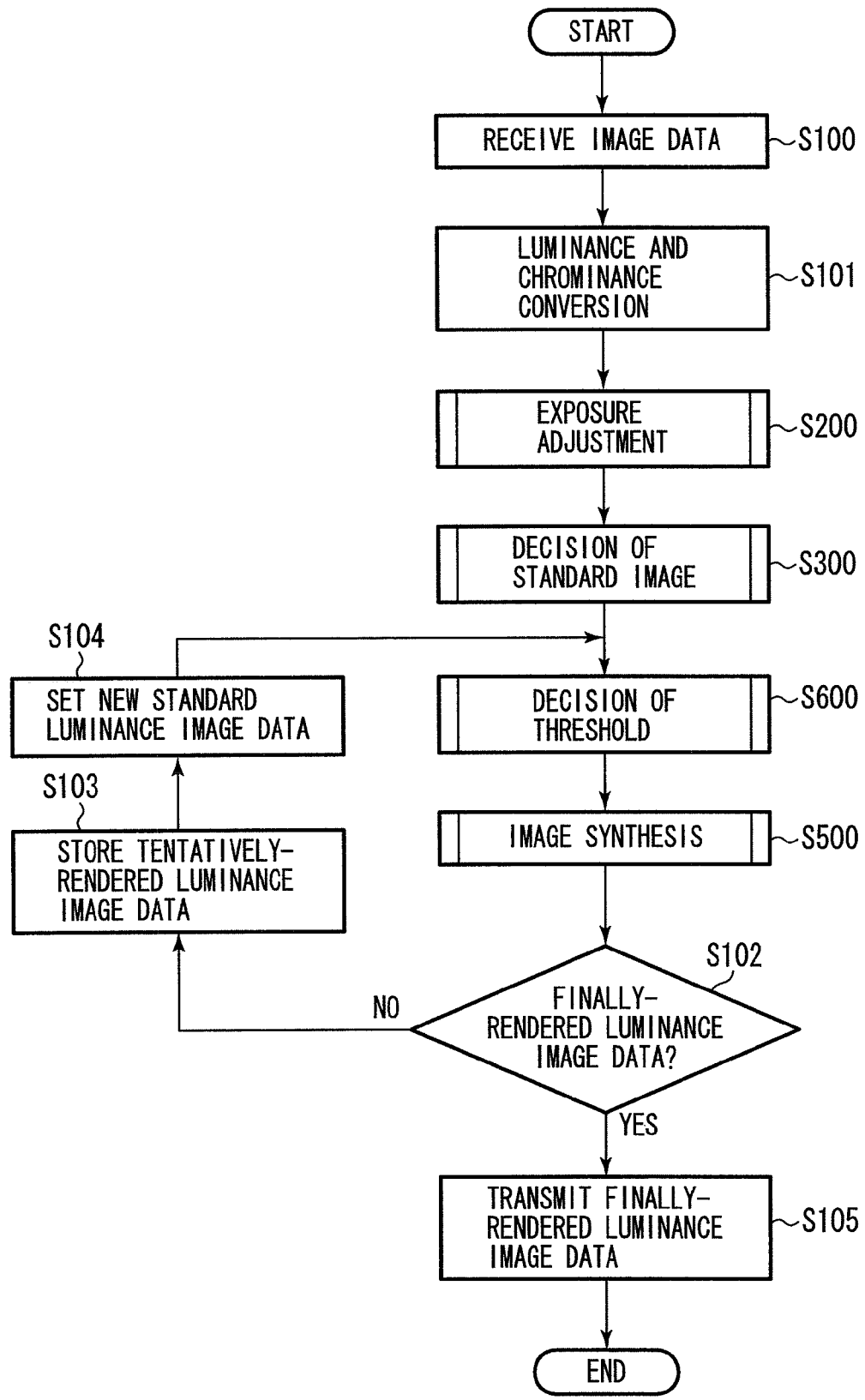
FIG. 27 is a flowchart illustrating the process of HDR rendering in the first embodiment.

As shown in FIG. 27, the image-processing unit 100 carries out the same operations from step S100-subroutine S300, as in the first embodiment. And the image-processing unit 100 generates the first-fifth exposure-level luminance image data and the standard-luminance image data is decided. After decision of the standard-luminance image data, the image processing circuit 100 carries out subroutine S600 for decision of the threshold instead of subroutine S400. After decision of the first and second conclusive thresholds at subroutine S600, the process proceeds to step S500.

At step S500, the image-processing unit 100 generates the rendered luminance image data, as in the first embodiment. After generating the rendered luminance image data, the steps S102-S105 are repeatedly carried out, as in the first embodiment. It is different from the first embodiment that the process returns to step S100 after transmitting the finally-rendered luminance image data to the monitor 65, and steps S100-S105 are repeated until the HDR rendering is completed.

Next, the subroutine of decision of the threshold at S600 is explained below using the flowcharts of FIGS. 28-30.

Figure 28:
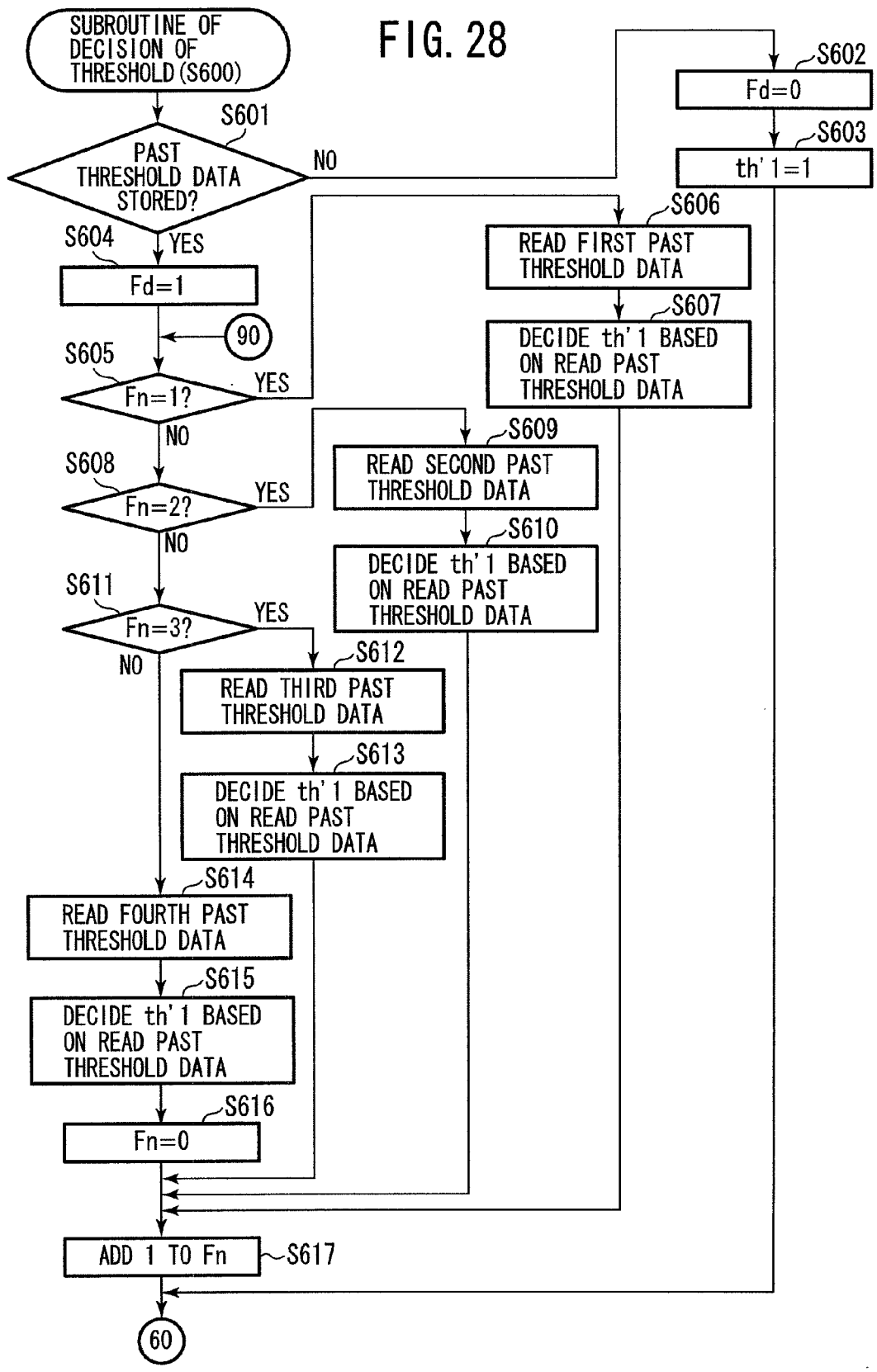
FIG. 28 is a first flowchart illustrating the subroutine for deciding the thresholds in the second embodiment.
Figure 29:
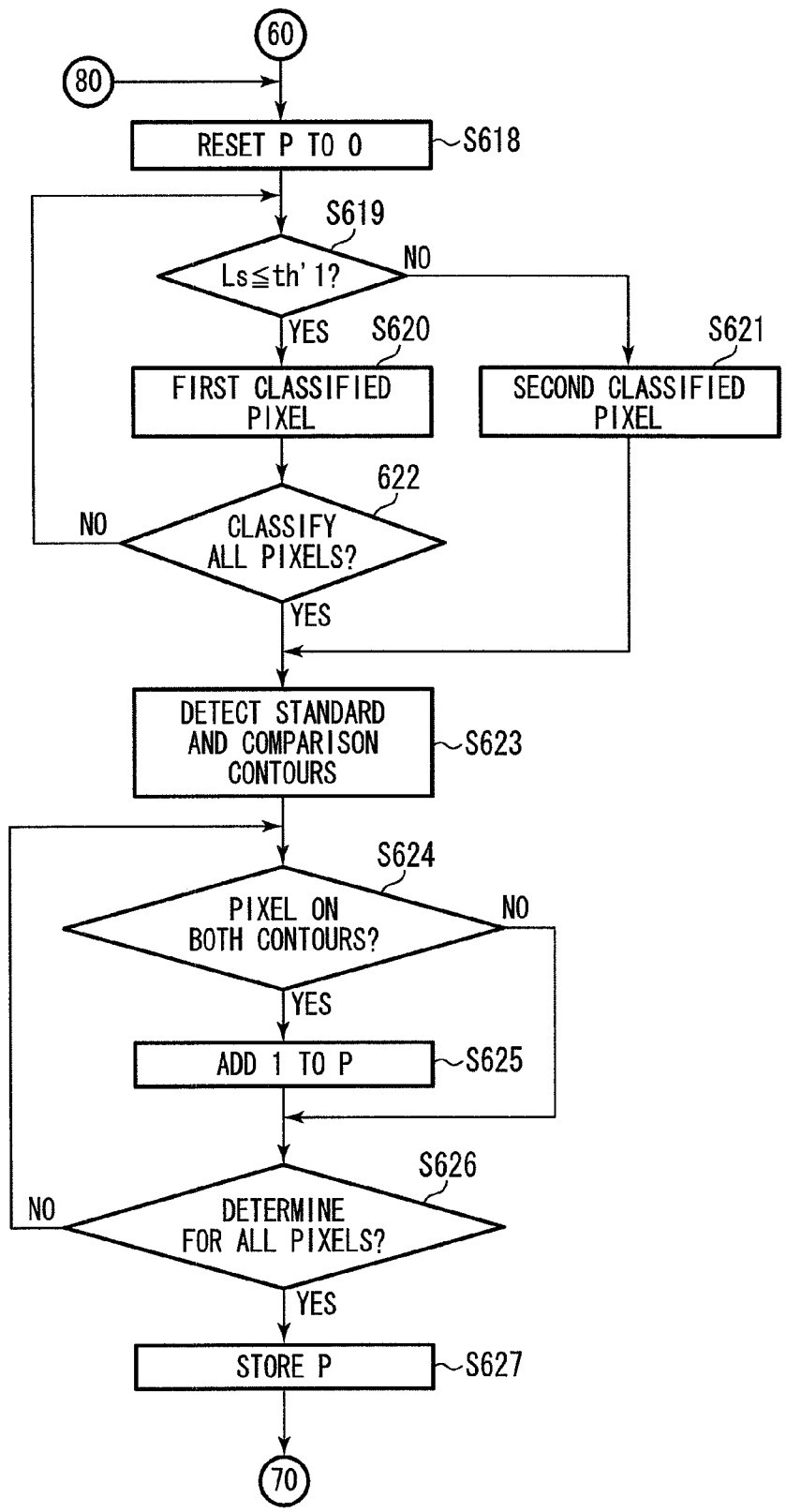
FIG. 29 is a second flowchart illustrating the subroutine for deciding the thresholds in the second embodiment.

As shown in FIG. 28, at step S601, the image-processing unit 100 determines whether or not all the first-fourth past threshold data is stored in the threshold memory 46. If all of them are not stored, the process proceeds to step S602. If all of them are stored, the process proceeds to step S604.

At step S602, the image-processing unit 100 sets a determination flag, hereinafter referred to as Fd, to zero.

At following step S603, the image-processing unit 100 sets the first tentative threshold to 1. After decision of the first tentative threshold (represented by "th'1" in FIGS. 28-30), the process proceeds to step S618.

At step S604, the image-processing unit 100 sets the Fd to be 1. After setting the Fd, the process proceeds to step S605.

At step S605, the image-processing unit 100 determines whether or not a past threshold number flag, hereinafter referred to as Fn, is 1. IF the Fn is 1, the process proceeds to step S606. If the Fn is not 1, the process proceeds to step S608.

At step S606, the image-processing unit 100 orders the tentative setting circuit 41 to read the first past threshold data stored in the threshold memory 46. At following step S607, the image-processing unit 100 decides the first tentative threshold first time on the basis of the first past threshold data. After decision of the first tentative threshold value, the process proceeds to step S617.

At step S608, the image-processing unit 100 determines whether or not the Fn is 2. If the Fn is 2, the process proceeds to step S609. If the Fn in not 2, the process proceeds to step S611.

At step S609, the image-processing unit 100 orders the tentative setting circuit 41 to read the second past threshold data stored in the threshold memory 46. At following step S610, the image-processing unit 100 decides the first tentative threshold first time on the basis of the second past threshold data. After decision of the first tentative threshold value, the process proceeds to step S617.

At step S611, the image-processing unit 100 determines whether or not the Fn is 3. If the Fn is 3, the process proceeds to step S612. If the Fn is not 3, the process proceeds to step S614.

At step S612, the image-processing unit 100 orders the tentative setting circuit 41 to read the third past threshold data stored in the threshold memory 46. At following step S613, the image-processing unit 100 decides the first tentative threshold first time on the basis of the third past threshold data. After decision of the first tentative threshold value, the process proceeds to step S617.

At step S614, the image-processing unit 100 orders the tentative setting circuit 41 to read the fourth past threshold data stored in the threshold memory 46. At following step S615, the image-processing unit 100 decides the first tentative threshold first time on the basis of the fourth past threshold data. In addition, at following step S616, the image-processing unit 100 resets the Fn to zero. After resetting the Fn, the process proceeds to step S617.

At step S617, which step S607, S610, S613, or S616 follows, the image-processing unit 100 adds 1 to the present Fn. After addition, the process proceeds to step S618.

At step S618, which step S603 or S617 follows, the image-processing unit 100 resets the accordance value (represented by "P" in FIGS. 29 and 30) to zero. After resetting the accordance value, the process proceeds to step S619.

At step S619, the image-processing unit 100 selects one pixel datum among the standard-luminance image data excluding the pixel data corresponding to the pixels classified at step S620 or S621. In addition, the image-processing unit 100 determines whether or not the value of the selected pixel data (represented by "Ls" in FIG. 29) is less than or equal to the first tentative threshold. If the value is less than or equal to the first tentative threshold, the process proceeds to step S620. If the value is greater than the first tentative threshold, the process proceeds to step S621.

At step S620, the image-processing unit 100 classifies the pixel corresponding to the selected pixel data into the first classified pixel. On the other hand, at step S621, the image-processing unit 100 classifies the pixel corresponding to the selected pixel data into the second classification pixel. After classification at step S620 or S621, the process proceeds to step S622.

At step S622, the image-processing unit 100 determines whether or not the classification is carried out for all the pixels corresponding to all the pixel data in the standard-luminance image data. If all the pixels are not classified, the process returns to step S619. After that steps S619-S622 are repeated until all the pixels are classified. If all the pixels are classified, the process proceeds to step S623.

At step S623, the image-processing unit 100 detects the standard contour and the comparison contour on the basis of the standard-luminance image data and the classification data about the first and second classified pixels, respectively. After detection of the standard and comparison contours, the process proceeds to step S624.

At step S624, the image-processing unit 100 selects one pixel corresponding to the pixel data which the standard luminance image comprises excluding the once selected pixels. In addition, the image-processing unit 100 determines whether or not the selected pixel is located on the standard and comparison contours. If the selected pixel is on the both contours, the process proceeds to step S625. If the selected pixel is not on neither contour, the process skips step S625 and proceeds to step S626.

At step S625, the image-processing unit 100 adds 1 to the present accordance value. After addition, the process proceeds to step S626.

At step S626, the image-processing unit 100 determines whether or not all the pixels corresponding to all the pixel data in the standard-luminance image data are selected for the determination whether or not the pixel is on both contours. If the determinations for all the pixels are not carried out, the process returns to step S624. After that, steps S624-S626 are repeated until the determinations for all the pixels are carried out. If the determinations for all the pixels are carried out, the process proceeds to step S627.

At step S627, the image-processing unit 100 stores the accordance-value data corresponding to the present accordance value related to the first tentative threshold data corresponding to the first tentative threshold presently set. After storing, the process proceeds to step S628.

Figure 30:
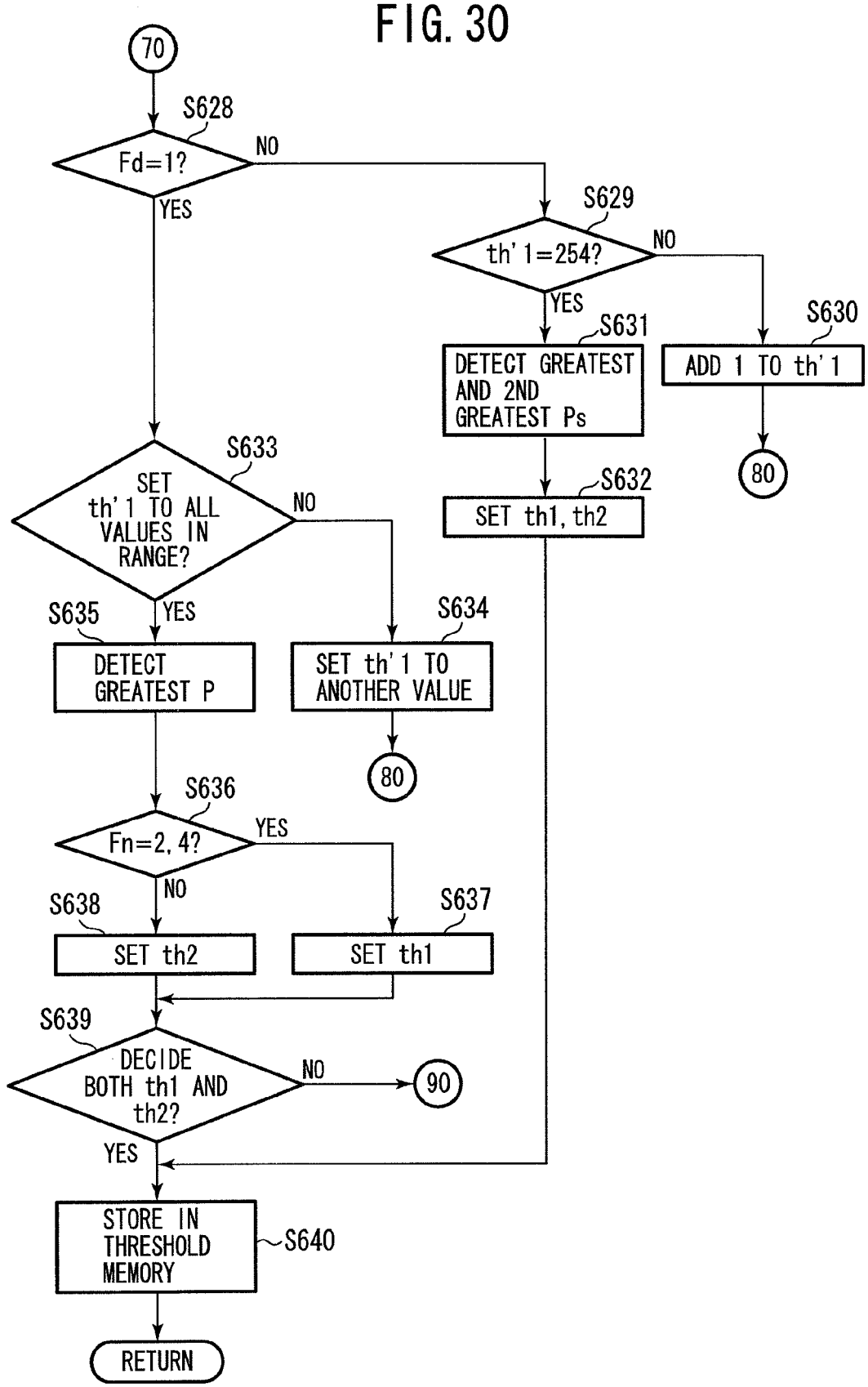
FIG. 30 is a third flowchart illustrating the subroutine for deciding the thresholds in the second embodiment.

As shown in FIG. 30, at step S628, the image-processing unit 100 determines whether or not the Fd is 1. If the Fd is not 1, the process proceeds to step S629. If the Fd is 1, the process proceeds to step S633.

At step S629, the image-processing unit 100 determines whether or not the first tentative threshold presently set is 254. If the first tentative threshold is not 254, the process proceeds to step S630, where the image-processing unit 100 adds 1 to the first tentative threshold presently set and sets a new first tentative threshold to it. Then, the process returns to step S618. After that, steps S618-S630 are repeated until the first tentative threshold becomes 254. If the first tentative threshold is 254, the process proceeds to step S631.

At step S631, the image-processing unit 100 detects the greatest and the second greatest accordance values among all the accordance values stored as the accordance-value data. After detection, the process proceeds to step S632.

At step S632, the image-processing unit 100 reads two first tentative threshold data stored with being related to the accordance-value data corresponding to the two accordance values detected at step S631. In addition, the image-processing unit 100 detects which first tentative thresholds corresponding to the read data are greater. In addition, the image-processing unit 100 sets the first conclusive threshold (represented by "th1" in FIG. 30) to the greater first tentative threshold, and sets the second conclusive threshold (represented by "th2" in FIG. 30) to the smaller first tentative threshold. After decision of the first and second conclusive thresholds, the process proceeds to step S640.

At step S633, which step S628 follows, the image-processing unit 100 determines whether or not the first tentative threshold is set to all the values in the range of ±5 from the first tentative threshold which is decided first time at step S607, S610, S613, or S615. If the first tentative threshold is not set to all the values, the process proceeds to step S634. If the first tentative threshold is set to all the values, the process proceeds to step S635.

At step S634, the image-processing unit 100 decides the value which the first tentative threshold is not set to within the range of ±5 from the first tentative threshold decided first time. After decision of the new first tentative threshold, the process proceeds to step S618. After that, steps S618-S634 are repeated until the first tentative threshold is set to all the values in the range.

At step S635, the image-processing unit 100 detects the greatest accordance value among those stored in the RAM. At following step S636, the image-processing unit 100 determines whether the Fn is 2 or 4. If the Fn is either 2 or 4, the process proceeds to step S637. If the Fn is neither 2 nor 4 (i.e., Fn is 1 or 3), the process proceeds to step S638.

At step S637, the image-processing unit 100 sets the first conclusive threshold to the first tentative threshold corresponding to the greatest accordance value detected at step S635. On the other hand, at step S638, the image-processing unit 100 sets the second conclusive threshold to the first tentative threshold corresponding to the greatest accordance value detected at step S635. After decision at step S637 or S638, the process proceeds to step 639.

At step S639, the image-processing unit 100 determines whether or not both the first and second conclusive thresholds are decided. If both of them are not decided, the process returns to step S605. After that, steps S605-S639 are repeated until both of them are decided. If both of them are decided, the process proceeds to step S640.

At step S640, which step S632 or S639 follows, the image-processing unit 100 stores first and second threshold data corresponding to the first and second conclusive thresholds in the threshold memory 46. After storing, the subroutine of decision of the threshold terminates. After termination of the subroutine of decision of the threshold, the image-processing unit 100 starts to carry out the subroutine of image synthesis, as in the first embodiment.

In the second embodiment above, it is possible to carry out HDR rendering without multiple captures, as in the first embodiment. Accordingly, a blur, appeared in an HDR image generated for a dynamic image using image data generated successively, can be reduced.

In the second embodiment above, it is possible to produce fine transition in brightness as compared to the method of simply multiplying the luminance data component by a constant gain, as in the first embodiment. Consequently, a subject, whose optical image is too bright or too dark may to be displayed clearly and in detail.

In the second embodiment above, the first and second conclusive thresholds are decided on the basis of the standard contour, in the first embodiment. Because contours of subjects and dividing lines between two different exposure-level luminance images, which correspond to different exposure-level luminance image data, coincides with each other owing to the threshold decided according to above, such dividing lines can be unclear in the HDR image.

In the second embodiment above, the tentative setting circuit 41 newly decides the first tentative threshold on the basis of ones decided for previously generated image data. Accordingly, when a frame of image data to be displayed changes, exposure-level luminance image data for some areas in a certain image data is not drastically changed. Consequently, it is prevented from changing exposure level of image for some areas in displaying a dynamic image.

The exposure conversion circuit 23 divides entire range of the original luminance image data into five ranges, and generates five kinds of luminance image data, which are the first-fifth exposure-level luminance image corresponding to the divided five ranges, in the first and second embodiments. However, the division of the entire range of the original luminance image data is not limited to five. The entire range can be divided into greater than or equal to 2.

The exposure conversion circuit 23 converts all the values in the original luminance image data into values ranging 0-255 in one of the first-fifth exposure-level luminance image data, in the first and second embodiments. However, all the values in the original luminance image data do not have to be converted into ones in the exposure-level luminance image data. For example, $\alpha \times 2/5 - (\alpha \times 3/5 - 1)$ and $(\alpha \times 3/5 + 1) - \alpha \times 4/5$ of the original luminance image data in the first and second embodiments can be converted into the first and second exposure-level luminance image data, respectively.

Or a certain value in the original luminance image data can be converted into values in two exposure-level luminance image data with duplication. For example, $\alpha \times 2/5 - (\alpha \times 3/5 + 1)$ and $(\alpha \times 3/5 - 1) - \alpha \times 4/5$ of the original luminance image data in the first and second embodiments can be converted into the first and second exposure-level luminance image data, respectively.

The range of the original luminance image data to be converted is $\alpha/5$, which is equal to those for all the exposure-level luminance image data, in the first and second embodiments. However, that can be different for every exposure-level luminance image data.

The original luminance image data is converted into the exposure-level luminance image data having values ranging from 0 to 255, in the first and second embodiments. However, the minimum value is not limited to 0. In addition, the maximum value may be any value as long as the maximum value of the exposure-level luminance image data is less than or equal to the maximum value of the rendered luminance image data. In addition, the minimum and maximum values may differ for each set of exposure-level luminance image data.

The standard-luminance image data is set to the luminance image 8-bit data, in the first and second embodiments. However, the luminance image data to which the standard-luminance image data is set is not limited to the luminance image 8-bit data. The standard-luminance image data can be set to the luminance image data whose word length is any numbers. If the maximum value of the standard-luminance image data is m4, it is preferable for the tentative setting circuit 41 to set the first tentative threshold to the value in the range between the minimum value and m4.

The finally-rendered luminance image 8-bit data is generated using luminance image data whose word length is greater than 8, in the first and second embodiments. However, the same effect can be achieved if the finally-rendered luminance image data can be generated on the basis of the luminance image data whose word length is less than or equal to that of the finally-rendered luminance image data.

The A/D converter 63 digitizes the image signal into the image 8-bit data (i.e., the image data ranging from zero to 255), in the first and second embodiments. However, the image signal may be converted into image data of arbitrary length.

The finally-rendered luminance image data is 8-bit data, and therefore ranges zero to 255, in the first and second embodiments. However, the maximum value of the finally-rendered luminance image data is not limited to 255. Finally-rendered luminance image whose maximum value is m2 may also be generated. The maximum value of the finally-rendered luminance image data should be decoded according to the standard of the other apparatus which would receive the rendered image data, such as the monitor 65.

The image synthesis circuit 52 smoothes the first-third mixture ratio values by averaging the first-third mixture ratio values ten times, respectively, in the first and second embodiments. However, the averaging can be carried out any number of times. In addition, the first-third mixture ratio values are smoothed by averaging the first-third mixture ratio values, respectively, for the focused pixel and the surrounding pixels which are located in 5 rows and 5 columns around the focused pixel, in the first and second embodiments. However, the number of surrounding pixels is not limited to 24, and their location is not limited. Any pixels adjacent to the focused pixel can be used as the surrounding pixels.

The smoothing is carried out by averaging the mixture ratio values of the focused pixel and the surrounding pixels, in the first and second embodiments. However, the smoothing can be carried out according to any other method that enables the reduction in the variation of the first-third mixture ratio values between the focused pixel and the surrounding pixels. Or the smoothing may be omitted. Even if the mixture ratio values are not smoothed, the HDR rendering can be carried out without multiple captures. However, smoothing is preferable in order to blur the dividing lines between two different exposure-level luminance images in the HDR image.

The first-third smoothed mixture ratio values are normalized such that the sum of the first-third smoothed mixture ratio values is 1, in the first and second embodiments. However, the normalization may be omitted. However, without normalization, an image of each pixel would be strange.

The gradation extension circuit 21 carries out gradation extension processing on the luminance image data and the word length of the luminance data component is extended, in the first and second embodiments. In the gradation extension processing, the word length to be extended is not limited to a specific word length, as long as its range after gradation extension processing has been extended from the original range.

The gradation extension circuit 21 extends the word length by averaging the values of the focused pixel and the surrounding pixels, amplifying the difference between the average and the value of the focused pixel, and adding the amplified difference to the average, in the first and second embodiments. However, the word length may be extended according to any other method.

The 8-bit conversion circuit 32 receives the luminance image data from the first processing circuit 11, and converts the luminance image data to 8 bits of luminance image data, in the first and second embodiment. However, the 8-bit conversion circuit 32 can receive the luminance image data from the gradation extension circuit 21, and convert the luminance image data to 8 bits of luminance image data.

The contour comparison circuit 44 counts the number of pixels which are located on both the standard and comparison contours as an accordance value, in the first and second embodiments. However, any other indicator to indicate how much the standard and comparison contours accord to each other can be detected, and is used instead of the accordance value.

The first tentative threshold is decided on the basis of the first conclusive threshold decided for the previous five frames of the rendered luminance image data, in the second embodiment. However, the first conclusive threshold for a single previous frame of the rendered luminance image data or for any previous frame of the rendered luminance image data may be used for decision of the first tentative threshold.

The past thresholds for the previous five frames of the rendered luminance image data are averaged with separate weighting, in the second embodiment. However, the past thresholds may be averaged without weighting. Of course, owing to weighting as in the above embodiment, the conclusive threshold of recent frame of image data can be more adjusted so as to improve the decision of the tentative threshold.

The above embodiment can be implemented by installing a program for generation of a rendered image onto an all purpose image-processing apparatus in which the program is stored in a non-transitory computer readable medium. The program for generation of a rendered image comprises a gradation extension code segment, an original image setting code segment, an exposure conversion code segment, a standard image-setting code segment, a tentative setting code segment, a classification code segment, a contour extraction code segment, a contour comparison code segment, a final setting code segment, and an image synthesis code segment. The gradation extension code segment causes a computer (not depicted) to convert the first image data into third image data if m1 is less than m2. The original image setting code segment causes the computer to set original image data to the third image data if m1 is less than m2. The exposure conversion code segment causes the computer to generate first and second exposure level image data on the basis of the original image data. The standard image-setting code segment causes the computer to set standard image data to image data comprising pixel data whose value may range to m4 on the basis of the first image data. The tentative setting code segment causes the computer to set a first tentative threshold within the range between lowest value and m4. The classification code segment causes the computer to classify pixels corresponding to the pixel data which the standard image data comprises to either first or second classified pixel. The contour extraction code segment causes the computer to extract standard and first comparison contours and to detect locations of the standard and first comparison contours. The contour comparison code segment causes the computer to detect a first accordance indicator to indicate how much the locations of the standard and first comparison contours accord to each other. The final setting code segment causes the computer to repeatedly carry out the change of the first tentative threshold, the classification to the first and second classified pixels, the detection of the locations of the standard and first comparison contours and the detection of the first accordance indicator, at least until maximum of the first accordance indicator is detected. The final setting code segment causes the computer to set a first conclusive threshold to the first tentative threshold whose the first accordance indicator is the highest among detected ones. The image synthesis code segment that causes the computer to generate the rendered image data by replacing the pixel data in the standard image data whose value is less than the first conclusive threshold with the pixel data in the first exposure level image data and replacing the pixel data in the standard image data whose value is less than the first conclusive threshold with the pixel data in the second exposure level image data.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2008-203829 (filed on Aug. 7, 2008), which is expressly incorporated herein, by reference, in its entirety.

The invention claimed is:

1. An image-processing unit, the image-processing unit generating rendered image data on the basis of first image data, the rendered image data comprising pixel data whose value may range to m2, m2 being a positive integer, the first image data comprising pixel data whose value may range to m1, m1 being a positive integer, the image-processing unit comprising:
   a gradation extension circuit that converts the first image data into third image data if m1 is less than m2, the third image data comprising pixel data whose value may range to m3, m3 being greater than m1;
   an original image setting circuit that sets original image data to the third image data if m1 is less than m2;
   an exposure conversion circuit that generates first and second exposure level image data on the basis of the original image data, the first exposure level image data being generated by converting the values of the pixel data in the original image data, less than s1, between s1 and t1, and greater than t1 into u1, the values which approach v1 from u1 in proportion to the value in the original image data in the range between s1 and t1, and v1, respectively, s1 being an integer greater than or equal to 1 and less than m2, u1 being an integer greater than or equal to 1, t1 being an integer greater than s1 and less than or equal to m2, v1 being an integer greater than u1 and less than or equal to m2, the second exposure level image data being generated by converting the values of the pixel data in the original image data, less than s2, between s2 and t2, and greater than t2 into u2, the values which approach v2 from u2 in proportion to the value in the original image data in the range between s2 and t2, and v2, respectively, s2 being an integer greater than s1 and less than m2, u2 being an integer greater than or equal to 1, t2 being an integer greater than s2 and t1 and less than or equal to m2, v2 being an integer greater than u2 and less than or equal to m2;
   a standard image-setting circuit that sets standard image data to image data comprising pixel data whose value may range to m4 on the basis of the first image data, m4 being a positive integer;
   a tentative setting circuit that sets a first tentative threshold within the range between a lowest value and m4;
   a classification circuit that classifies pixels corresponding to the pixel data which the standard image data comprises to either first or second classified pixel, the pixel corresponding to the pixel data whose value is less than or greater than the first tentative threshold being classified to the first or second classified pixel, respectively;
   a contour extraction circuit that extracts standard and first comparison contours and detects locations of the standard and first comparison contours, the standard contour being a contour of subject in an image corresponding to the standard image data, the first comparison contour being a dividing line between the first and second classified neighboring pixels;
   a contour comparison circuit that detects a first accordance indicator to indicate how much the locations of the standard and first comparison contours accord to each other;
   a final setting circuit that orders the tentative setting circuit, the classification circuit, the contour extraction circuit, and the contour comparison circuit to repeatedly carry out the change of the first tentative threshold, the classification to the first and second classified pixels, the detection of the locations of the standard and first comparison contours, and the detection of the first accordance indicator, respectively, at least until maximum of the first accordance indicator is detected, the final setting circuit setting a first conclusive threshold to the first tentative threshold whose the first accordance indicator is the highest among detected ones; and
   an image synthesis circuit that generates the rendered image data by replacing the pixel data in the standard image data whose value is less than the first conclusive threshold with the pixel data in the first exposure level image data and replacing the pixel data in the standard image data whose value is less than the first conclusive threshold with the pixel data in the second exposure level image data.

2. An image-processing unit according to claim 1, wherein,
   the exposure conversion circuit generates third exposure level image data on the basis of the original image data, the third exposure level image data being generated by converting the values of the pixel data in the original image data, less than s3, between level s3 and t3, and greater than t3, into u3; the values which approach v3 from u3 in proportion to the value in the original image data in the range between s3 and t3, and v3, respectively, s3 being an integer greater than or equal to 1 and less than s1, u3 being an integer greater than or equal to 1, t3 being an integer greater than s3 and less than t1, v3 being an integer greater than u3 and less than or equal to m2,
   the tentative setting circuit sets a second tentative threshold to one value less than the first tentative threshold within the range between the lowest value and m4,
   the classification circuit classifies pixels, corresponding to the pixel data which the standard image data comprises and whose value is less than the second tentative threshold, to a third classified pixel,
   the contour extraction circuit extracts second comparison contours and detects a location of the second comparison contours, the second comparison contour being dividing lines between the first and third classified neighboring pixels and the second and third classified neighboring pixels, the contour comparison circuit detects a second accordance indicator to indicate how much the locations of the standard and second comparison contours accord to each other, the final setting circuit orders the tentative setting circuit, the classification circuit, the contour extraction circuit, and the contour comparison circuit, to repeatedly carry out the change of the second tentative threshold, the classification of the first-third classified pixels, the detection of the locations of the standard and second comparison contours, and the detection of the second accordance indicator, respectively, at least until maximum of the second accordance indicator is detected, the final setting circuit setting the second conclusive threshold to the second tentative threshold whose second accordance indicator is the highest among detected ones, and the image synthesis circuit generates the rendered image data by replacing the pixel data in the standard image data whose value is less than the second conclusive threshold with the pixel data in the third exposure level image data, replacing the pixel data in the standard image data whose value is either greater or less than the second and first conclusive thresholds, respectively, with the pixel data in the first exposure level image data, and replacing the pixel data in the standard image data whose value is greater than the first conclusive threshold with the pixel data in the second exposure level image data.

3. An image-processing unit according to claim 1, wherein, the exposure conversion circuit generates fourth exposure level image data on the basis of the original image data, the fourth exposure level image data being generated by converting the values of the pixel data in the original image data, less than s4, between s4 and t4, and greater than t4 into u4, the values which approach v4 from u4 in proportion to the value in the original image data in the range between s4 and t4, and v4, respectively, s4 being an integer greater than s2 and less than m2, u4 being an integer greater than or equal to 1, t4 being an integer greater than s4 and t2 and less than m2, v4 being an integer greater than u4 and less than or equal to m2, after the image synthesis circuit generates the rendered image data, the standard image-setting circuit sets the new standard image data to the rendered image data, the tentative setting circuit sets third tentative threshold within the range between the lowest value and m4, the classification circuit classifies pixels corresponding to the pixel data which the new standard image data comprises to either fourth or fifth classified pixel, the pixel corresponding to the pixel data whose value is less than or greater than the third tentative threshold being classified to the fourth and fifth classified pixel, respectively, the contour extraction circuit extracts standard and third comparison contours and detects locations of the standard and third comparison contours, the standard contour being a contour of subject in an image corresponding to the new standard image data, the third comparison contour being a dividing line between the fourth and fifth classified neighboring pixels, the contour comparison circuit detects a third accordance indicator to indicate how much the standard and third comparison contours accord to each other, the final setting circuit orders the tentative setting circuit, the classification circuit, the contour extraction circuit, and the contour comparison circuit to repeatedly carry out the change of the third tentative threshold, the classification to the fourth and fifth classified pixels, the detection of the locations of the standard and third comparison contours, and the detection of the third accordance indicator, respectively, at least until maximum of the third accordance indicator is detected, the final setting circuit setting the third conclusive threshold to the third tentative threshold whose the third accordance indicator is the highest among detected ones, and the image synthesis circuit generate the rendered image data by using the pixel data in the new standard image data whose value is less than the third conclusive threshold with the pixel data in the new standard image data, and replacing the pixel data in the new standard image data whose value is greater than the third conclusive threshold with the pixel data in the third exposure level image data.

4. An image-processing unit according to claim 1, further comprising a smoothing circuit block that smoothes the pixel data in the rendered image data using the pixel data corresponding to the same pixel in another exposure level image data.

5. An image-processing unit according to claim 4, wherein, the smoothing circuit block comprises an estimation circuit, an averaging circuit, and a replacement circuit, the estimation circuit decides first and second mixture ratio values for each pixel data, the first and second mixture ratio values are set to $\alpha$ and 0, respectively, if the value of the pixel data in the standard image data is less than the first conclusive threshold, the first and second mixture ratio values are set to 0 and $\alpha$, respectively, if the value of the pixel data in the standard image data is greater than the first conclusive threshold, $\alpha$ being a positive integer, the averaging circuit calculates first and second averaged mixture ratio values, the first averaged mixture ratio value being calculated by averaging the first mixture ratio values of a first focused pixel and first surrounding pixel, the first focused pixel being selected one by one, the first surrounding pixel being located around the first focused pixel, the second averaged mixture ratio value being calculated by averaging the second mixture ratio values of a first focused pixel and first surrounding pixel, and the replacement circuit replaces the pixel data in the rendered image data with smoothed pixel data, the smoothed pixel data being calculated by adding the pixel data of the same pixel in the first and second exposure level image data with multiplying by the first and second averaged mixture ratio values, respectively.

6. An image-processing unit according to claim 5, wherein the averaging circuit repeats to average the first averaged mixture ratio values of the first focused pixel and the first surrounding pixel predetermined times and to average the second averaged mixture ratio values of the focused pixel and the first surrounding pixel predetermined times.

7. An image-processing unit according to claim 6, wherein the averaging circuit normalizes the first and second averaged mixture ratio values, and communicates the normalized first and second averaged mixture ratio values to the replacement circuit.

8. An image-processing unit according to claim 1, further comprising a memory that stores the first conclusive threshold decided for a second frame of the first image data, the second frame being previous in the first frame, the tentative setting circuit deciding the first tentative threshold at beginning on the basis of the first conclusive threshold stored in the memory in order to generate the rendered image data on the basis of the first frame of the first image data.

9. An image-processing unit according to claim 8, wherein,
the memory stores the first conclusive threshold set for a third frame of the first image data, the third frame being previous in the second frame, and
the tentative setting circuit decides the first tentative threshold at beginning on the basis of the first conclusive thresholds, for the second and third frames of the first image data, stored in the memory in order to generate the rendered image data on the basis of the first frame of the first image data.

10. An image-processing unit according to claim 9, wherein the tentative setting circuit weights the first conclusive thresholds for the second and third frames of the first image data stored in the memory, and decides the first tentative threshold at beginning on the basis of the weighted first conclusive thresholds.

11. An image-processing unit according to claim 10, wherein,
the gradation extension circuit calculates an average value of second focused and surrounding pixel data in the first image data, the second focused pixel data corresponding to a second focused pixel which is selected one by one, the second surrounding pixel data corresponding to a second surrounding pixel being located around the second focused pixel, and
the gradation extension circuit converts the first image data into the third image data by multiplying the difference between the average value and the value of the second focused pixel data by predetermined amplification coefficient and replacing data of the average value which the multiplied difference is added to with the pixel data in the first image data.

12. An image-processing unit according to claim 1, wherein the contour comparison circuit detects the number of the pixels which are located on both the standard and first comparison contours as the first accordance indicator.

13. An image-processing unit according to claim 1, wherein the original image setting circuit sets the original image data to the first image data if the m1 is greater than the m2.

14. An image-processing unit according to claim 1, wherein the standard image-setting circuit sets the standard image data to the first or third image data whose value is multiplied by the m4/m1 or m4/m3.

15. An image-processing unit according to claim 1, wherein m4 is equal to m2.

16. An image-processing unit according to claim 1, wherein u1 and u2 are equal to 1 and v1 and v2 are equal to m2.

17. An imaging apparatus, the imaging apparatus generating rendered image data on the basis of first image data, the rendered image data comprising pixel data whose value may range to m2, m2 being a positive integer, the first image data comprising pixel data whose value may range to m1, m1 being a positive integer, the imaging apparatus comprising:
a gradation extension circuit that converts the first image data into third image data if m1 is less than m2, the third image data comprising pixel data whose value may range to m3, m3 being greater than m1;
an original image setting circuit that sets original image data to the third image data if m1 is less than m2;
an exposure conversion circuit that generates first and second exposure level image data on the basis of the original image data, the first exposure level image data being generated by converting the values of the pixel data in the original image data, less than s1, between s1 and t1, and greater than t1 into u1, the values which approach v1 from u1 in proportion to the value in the original image data in the range between s1 and t1, and v1, respectively, s1 being an integer greater than or equal to 1 and less than m2, u1 being an integer greater than or equal to 1, t1 being an integer greater than s1 and less than or equal to m2, v1 being an integer greater than u1 and less than or equal to m2, the second exposure level image data being generated by converting the values of the pixel data in the original image data, less than s2, between s2 and t2, and greater than t2 into u2, the values which approach v2 from u2 in proportion to the value in the original image data in the range between s2 and t2, and v2, respectively, s2 being an integer greater than s1 and less than m2, u2 being an integer greater than or equal to 1, t2 being an integer greater than s2 and t1 and less than or equal to m2, v2 being an integer greater than u2 and less than or equal to m2;
a standard image-setting circuit that sets standard image data to image data comprising pixel data whose value may range to m4 on the basis of the first image data, m4 being a positive integer;
a tentative setting circuit that sets a first tentative threshold within the range between a lowest value and m4;
a classification circuit that classifies pixels corresponding to the pixel data which the standard image data comprises to either first or second classified pixel, the pixel corresponding to the pixel data whose value is less than or greater than the first tentative threshold being classified to the first or second classified pixel, respectively;
a contour extraction circuit that extracts standard and first comparison contours and detects locations of the standard and first comparison contours, the standard contour being a contour of subject in an image corresponding to the standard image data, the first comparison contour being a dividing line between the first and second classified neighboring pixels;
a contour comparison circuit that detects a first accordance indicator to indicate how much the locations of the standard and first comparison contours accord to each other;
a final setting circuit that orders the tentative setting circuit, the classification circuit, the contour extraction circuit, and the contour comparison circuit to repeatedly carry out the change of the first tentative threshold, the classification to the first and second classified pixels, the detection of the locations of the standard and first comparison contours, and the detection of the first accordance indicator, respectively, at least until maximum of the first accordance indicator is detected, the final setting circuit setting a first conclusive threshold to the first tentative threshold whose the first accordance indicator is the highest among detected ones; and
an image synthesis circuit that generates the rendered image data by replacing the pixel data in the standard image data whose value is less than the first conclusive threshold with the pixel data in the first exposure level image data and replacing the pixel data in the standard image data whose value is less than the first conclusive threshold with the pixel data in the second exposure level image data.

18. A computer program product stored in a non-transitory computer readable medium, the computer program product causing a computer to generate rendered image data on the basis of first image data, the rendered image data comprising pixel data whose value may range to m2, m2 being a positive integer, the first image data comprising pixel data whose value may range to m1, m1 being a positive integer, the computer program product comprising:

- a gradation extension code segment that causes the computer to convert the first image data into third image data if m1 is less than m2, the third image data comprising pixel data whose value may range to m3, m3 being greater than m1;
- an original image setting code segment that causes the computer to set original image data to the third image data if m1 is less than m2;
- an exposure conversion code segment that causes the computer to generate first and second exposure level image data on the basis of the original image data, the first exposure level image data being generated by converting the values of the pixel data in the original image data, less than s1, between s1 and t1, and greater than t1 into u1, the values which approach v1 from u1 in proportion to the value in the original image data in the range between s1 and t1, and v1, respectively, s1 being an integer greater than or equal to 1 and less than m2, u1 being an integer greater than or equal to 1, t1 being an integer greater than s1 and less than or equal to m2, v1 being an integer greater than u1 and less than or equal to m2, the second exposure level image data being generated by converting the values of the pixel data in the original image data, less than s2, between s2 and t2, and greater than t2 into u2, the values which approach v2 from u2 in proportion to the value in the original image data in the range between s2 and t2, and v2, respectively, s2 being an integer greater than s1 and less than m2, u2 being an integer greater than or equal to 1, t2 being an integer greater than s2 and t1 and less than or equal to m2, v2 being an integer greater than u2 and less than or equal to m2;
- a standard image-setting code segment that causes the computer to set standard image data to image data comprising pixel data whose value may range to m4 on the basis of the first image data, m4 being a positive integer;
- a tentative setting code segment that causes the computer to set a first tentative threshold within the range between a lowest value and m4;
- a classification code segment that causes the computer to classify pixels corresponding to the pixel data which the standard image data comprises to either first or second classified pixel, the pixel corresponding to the pixel data whose value is less than or greater than the first tentative threshold being classified to the first or second classified pixel, respectively;
- a contour extraction code segment that causes the computer to extract standard and first comparison contours and to detect locations of the standard and first comparison contours, the standard contour being a contour of subject in an image corresponding to the standard image data, the first comparison contour being a dividing line between the first and second classified neighboring pixels;
- a contour comparison code segment that causes the computer to detect a first accordance indicator to indicate how much the locations of the standard and first comparison contours accord to each other;
- a final setting code segment that causes the computer to repeatedly carry out the change of the first tentative threshold, the classification to the first and second classified pixels, the detection of the locations of the standard and first comparison contours, and the detection of the first accordance indicator, at least until maximum of the first accordance indicator is detected, the final setting code segment causing the computer to set a first conclusive threshold to the first tentative threshold whose the first accordance indicator is the highest among detected ones; and
- an image synthesis code segment that causes the computer to generate the rendered image data by replacing the pixel data in the standard image data whose value is less than the first conclusive threshold with the pixel data in the first exposure level image data and replacing the pixel data in the standard image data whose value is less than the first conclusive threshold with the pixel data in the second exposure level image data.

* * * * *